(12) United States Patent
Horio et al.

(10) Patent No.: US 7,917,640 B2
(45) Date of Patent: Mar. 29, 2011

(54) COMMUNICATION BANDWIDTH CONTROL METHOD FOR A BROADCAST COMMUNICATION SYSTEM, A SERVER AND A USER TERMINAL USED IN A BROADCAST COMMUNICATION SYSTEM, AND A PROGRAM

(75) Inventors: Kenichi Horio, Akashi (JP); Takashi Ohno, Kobe (JP); Satoshi Okuyama, Kobe (JP)

(73) Assignee: Fujitsu Limited, Kawasaki (JP)

( * ) Notice: Subject to any disclaimer, the term of this patent is extended or adjusted under 35 U.S.C. 154(b) by 1429 days.

(21) Appl. No.: 11/174,492

(22) Filed: Jul. 6, 2005

(65) Prior Publication Data
US 2006/0075095 A1 Apr. 6, 2006

(30) Foreign Application Priority Data
Sep. 2, 2004 (JP) .................................. 2004-256066

(51) Int. Cl.
*G06F 15/16* (2006.01)
(52) U.S. Cl. ........................................ 709/229; 709/204
(58) Field of Classification Search .................. 709/204, 709/226; 370/395.41, 468
See application file for complete search history.

(56) References Cited

U.S. PATENT DOCUMENTS

| 7,072,344 | B2 * | 7/2006 | Abdelilah et al. | ........ | 370/395.21 |
| 7,170,858 | B2 * | 1/2007 | Abraham et al. | ............. | 370/235 |
| 7,218,644 | B1 * | 5/2007 | Heinonen et al. | ............. | 370/468 |
| 7,366,780 | B2 * | 4/2008 | Keller et al. | ................... | 709/227 |
| 2002/0093948 | A1 | 7/2002 | Dertz et al. | | |
| 2002/0111134 | A1 * | 8/2002 | Salurso et al. | ............... | 455/3.06 |
| 2004/0076118 | A1 | 4/2004 | Ho et al. | | |
| 2004/0120474 | A1 | 6/2004 | Lopponen et al. | | |
| 2004/0131042 | A1 | 7/2004 | Lillie et al. | | |

FOREIGN PATENT DOCUMENTS

| JP | 2000-244490 | 9/2000 |
| KR | 100233137 B1 | 9/1999 |
| WO | WO 99/63773 | 12/1999 |
| WO | 00/10099 | 2/2000 |
| WO | 2004/008336 A1 | 1/2004 |

OTHER PUBLICATIONS

European Search Report issued Nov. 3, 2005 for European Patent Application No. 05254573.8.
Korean Patent Office Action, mailed Aug. 20, 2008 and issued in corresponding Korean Patent Application No. 10-2006-0092907.
European Search Report dated Jan. 18, 2010 and issued in corresponding European Patent Application 09176544.6.

* cited by examiner

*Primary Examiner* — J Bret Dennison
(74) *Attorney, Agent, or Firm* — Staas & Halsey LLP

(57) ABSTRACT

A method transmitting and receiving data other than voice data and preventing deterioration in quality of communication voice data due to transmission and reception of the other than voice data, and utilizing a limited communication bandwidth when a plurality of users conduct the broadcast communication through common use of the conference room on the network. Upon a user terminal transmitting second data, verifying whether any of a plurality of identified user terminals has a right of transmission of first data. The method further includes that upon a user terminal having the a transmission right of first data, setting a value obtained by subtracting the communication bandwidth required for transmission of the first data from the communication bandwidth which each user terminal can use as the communication bandwidth for transmission of the second data. Upon no user terminal having a transmission right of first data, setting a communication bandwidth that each user terminal can use as the communication bandwidth for transmission of the second data.

37 Claims, 19 Drawing Sheets

| USER ID | DISPLAY NAME | NAME | ADDRESS |
|---|---|---|---|
| horio@fujipoc.com | HORIO | ICHIRO HORIO | AKASHI-CITY |
| ohno@fujipoc.com | OHNO | JIRO OHNO | KOBE-CITY |
| okuyama@fujipoc.com | OKUYAMA | SABURO OKUYAMA | OHSAKA-CITY |
| ⋮ | ⋮ | ⋮ | ⋮ |

| CONFERENCE ROOM ID | MEMBER | PARTICIPANT | VOICE |
|---|---|---|---|
| PoCSes001 | horio@fujipoc.com<br>ohno@fujipoc.com<br>okuyama@fujipoc.com | horio@fujipoc.com<br>ohno@fujipoc.com<br>okuyama@fujipoc.com | horio@fujipoc.com |
| PoCSes901 | abc@ffPoC.com<br>bcd@ddPoC.com<br>efg@ppPoC.com | | |
| ⋮ | ⋮ | ⋮ | ⋮ |

| PARTICIPANT | DOWN-STREAM BANDWIDTH |
|---|---|
| horio@fujipoc.com | 9.6Kbps |
| ohno@fujipoc.com | 9.6Kbps |
| okuyama@fujipoc.com | 144Kbps |
| ⋮ | ⋮ |

| CONFERENCE ROOM ID 141 | TRANSMITTING USER 142 | TRANSMITTING DESTINATION USER 143 | PRIORITY 144 | CLASS OF DATA 145 | CAPA-CITY 146 | CONTENT 147 |
|---|---|---|---|---|---|---|
| PoCSes001 | horio@fujipoc.com | ALL MEMBERS | ORDINARY | JPEG | 1 M B | ABC. JPEG |
| | okuyama@fujipoc.com | ohno@fujipoc.com | EMER-GENCY | IM-MSG | 1 K B | PLEASE CALL ME? |
| ... | ... | ... | ... | ... | ... | ... |

| VOICE OWNER (181) | PARTNER (182) |
|---|---|
| okuyama@fujipoc.com | ikeda@fujipoc.com |
| horio@fujipoc.com | ohno@fujipoc.com |

| CONFERENCE ROOM ID (61) | MEMBER (62) | PARTICIPANT (63) | VOICE (64) | |
|---|---|---|---|---|
| | | | VOICE OWNER (65) | PARTNER (66) |
| PoCSes001 | horio@fujipoc.com<br>ohno@fujipoc.com<br>okuyama@fujipoc.com<br>ikeda@fujipoc.com | horio@fujipoc.com<br>ohno@fujipoc.com<br>okuyama@fujipoc.com<br>ikeda@fujipoc.com | okuyama@fujipoc.com<br>horio@fujipoc.com | ikeda@fujipoc.com<br>ohno@fujipoc.com |
| PoCSes901 | abc@ffPoC.com<br>bcd@ddPaC.com<br>efg@ppPoC.com | | | |
| ... | ... | ... | ... | ... |

COMMUNICATION BANDWIDTH CONTROL METHOD FOR A BROADCAST COMMUNICATION SYSTEM, A SERVER AND A USER TERMINAL USED IN A BROADCAST COMMUNICATION SYSTEM, AND A PROGRAM

CROSS-REFERENCE TO RELATED APPLICATIONS

This application claims the benefit of Japanese Patent Application No. 2004-256066, filed on Sep. 2, 2004 in the Japanese Patent Office, the disclosure of which is incorporated herein by reference.

BACKGROUND OF THE INVENTION

1. Field of the Invention

The present invention relates to a broadcast communication system for communication through transmission and reception of data via a communication network among a plurality of user terminals, and particularly to a broadcast communication system for distributing received data to designated user terminals by accepting the data and designation of the data transmitting destination from any of the user terminals.

A communication group which is virtually formed on the network for making broadcast communication among a plurality of user terminals is called a "conference room". This conference room may have various profiles and forms a communication group with the communication partners designated by the user terminals.

2. Description of the Related Art

In recent years, a transceiver technology utilizing a mobile communication network and a wireless LAN of cellular phones called PoC (Push-to-Talk over Cellular) and PoC/W (Push-to-Talk over Cellular/Wireless) has been put into the practical use. This transceiver function enables simultaneous voice communication to a plurality of partners on an IP communication network. A plurality of users, who can simultaneously communicate via voice are connected via a conference room on the network that is previously set or temporarily set. When a user, among those users connected in a same conference room, transmits a voice signal by acquiring the right to speak, the voice signals are distributed to the other users of the same conference room.

This transceiver function is primarily for communication by voice, but is capable of processing data for other than voice communication with improved cellular phones, for example. In addition, it is expected that communications will be further improved by distributing data for other than voice communication to the other users of the same conference room. However, the communication bandwidth for transmitting and receiving of the data is limited, particularly in the use of cellular phones. If voice and data communications other than voice are transmitted and received in combination, a delay and a fluctuation of the voice data are increased, resulting in a deterioration of a quality of the voice communication received. A method for avoiding such delay and fluctuation has been proposed to preset the communication bandwidth for voice communication and for the data other than the voice communication. However, in this method, if only one type of data is transmitted and received, since the communication network acquires respective data according to the preset fixed values, only the previously determined bandwidth is used. Thus, communication bandwidth reserved for data that is not transmitted is left unused, and thereby the available communication bandwidth is not used effectively. Thus, a problem exists that such conventional methods are inefficient in use of bandwidth.

A method has also been proposed in which information for varying a communication rate is collected from the user terminals taking part in the conference room whenever the right to speak is changed in the multiple-point conference system and the additional information such as picture information is distributed on the basis of the collected communication rate varying information. However, a problem still exists with such methods in that use of bandwidths is inefficient.

SUMMARY OF THE INVENTION

According to an aspect of the present invention a plurality of users conduct broadcast communications using a common conference room formed on the network, transmitting and receiving voice data and data other than the voice data. Deterioration in a quality of voice communication by a transmission and reception of the other data communications is prevented, and the limited communication bandwidth is used effectively. The quality of data, such as voice data and picture data, required to have realtime properties is influenced by the communication bandwidth both on the transmitting side and receiving side when such data is obtained and reproduced through communication. Moreover, the communication bandwidth varies according to a kind of network connecting the user terminals. Even when a plurality of user terminals of different available communication bandwidths are connected, means are provided to control the communication bandwidth so that the available communication bandwidth is effectively controlled.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 is a block diagram illustrating an example of a user management unit;

FIG. 6 is a block diagram illustrating an example of a PTT management unit;

FIG. 13 is a block diagram illustrating an example of a down-stream bandwidth storage unit;

FIG. 14 is a block diagram illustrating an example of a distribution data storage unit;

FIG. 21 is a flow chart illustrating another example of the PTT management unit.

DETAILED DESCRIPTION OF THE PREFERRED EMBODIMENTS

Figure 1:
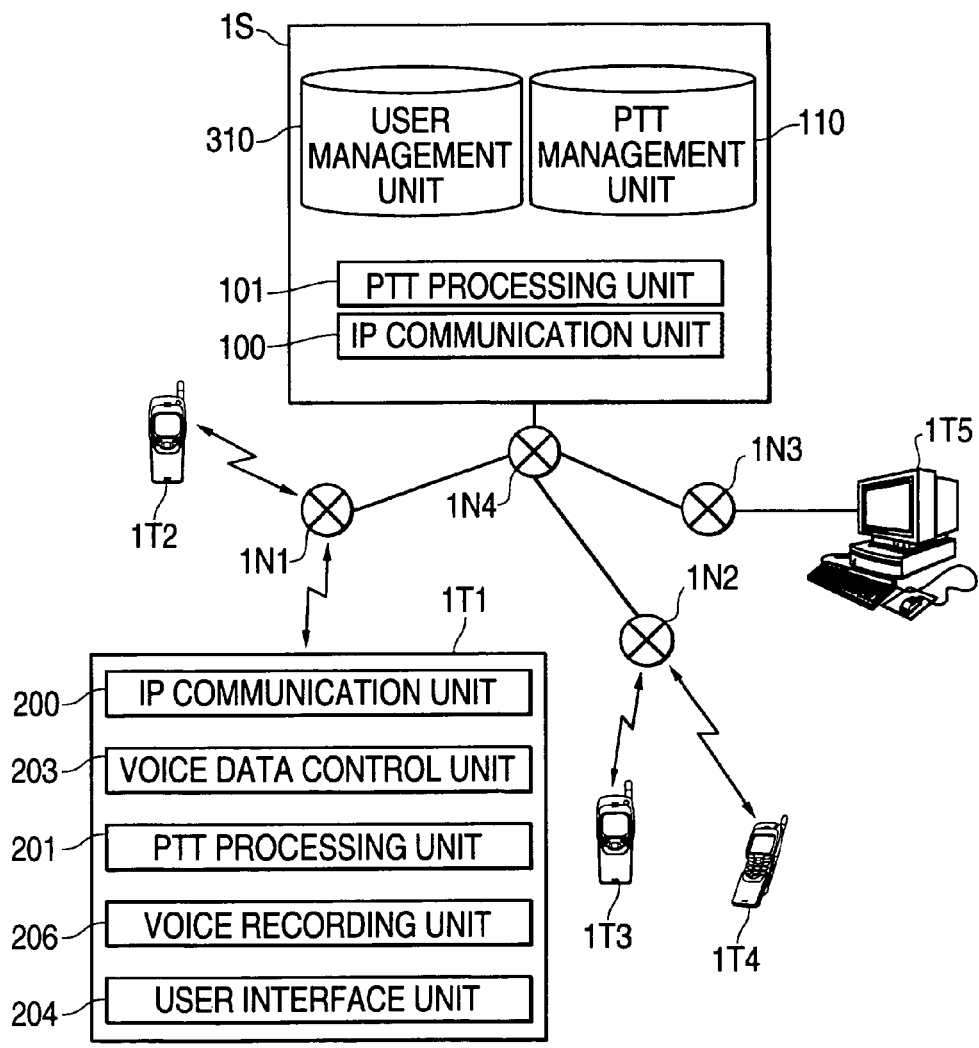
FIG. 1 is a block diagram illustrating a broadcast communication system.

Reference will now be made in detail to the embodiments of the present invention, examples of which are illustrated in the accompanying drawings, wherein like reference numerals refer to the like elements throughout. The embodiments are described below to explain the present invention by referring to the figures.

According to an aspect of the present invention a broadcast communication system in which the data is transmitted and received via a communication network among a plurality of identified user terminals is provided. Advantages of the present invention are realized both for data that is primarily transmitted and received and for other data. The quality of the data which is mainly transmitted and received is influenced by the condition of communication in the broadcast communication system in which any of a plurality of identified user terminals transmits the data and the received data is distributed to the other user terminals.

According to aspects of the present invention, a communication bandwidth is controlled for transmitting or distributing data other than voice data. The bandwidth is controlled in accordance with a receiving condition of the data, e.g., whether voice data, for example, is required to have a realtime property and whether the data other than the voice data is required to have a realtime property. A condition of the communication bandwidth is observed for each user terminal that differs in accordance with the condition of communication within a group. A condition in a case of the communication system in which a right to speak is given to a user, among those in the user group in the group of a plurality of users, is identified and a content of speech by the user who is given the right to speak is distributed to the other users of the same group.

According to an aspect of the present invention, a communication bandwidth control method for a broadcast communication system in which any of a plurality of user terminals acquires the transmission right of a first data includes transmitting the first data and distributing the first data transmitted from a relevant user terminal to the other user terminals of a plurality of user terminals via a communication network. The distribution includes that values of the communication bandwidths, which user terminals can use, are collected and stored corresponding to the information identifying the user terminals. Whether any of a plurality of user terminals has a transmission right of the first data is verified when second data is received from the user terminals. When user terminals having the transmission right of the first data exist, the communication bandwidth, which a user of the user terminals can use is set as the communication bandwidth for transmitting the second data for the user terminals having the transmission right of the first data. A value obtained by subtracting the communication bandwidth required for transmission of the first data from the communication bandwidth which the user terminals can use is set as the useable communication bandwidth for transmission of the second data for the user terminals not having a transmission right of the first data. When the user terminals having a transmission right of the first data do not exist, the communication bandwidth which the user terminals can use is set as the communication bandwidth used for transmitting the second data. According to this method, the first data transmitting and receiving information is verified and the communication bandwidth for transmission of the second data is controlled for each user terminal depending on whether the user terminal having the transmission right of the first data exists.

According to another aspect of the present invention, a server to which the communication bandwidth control method is applied is provided.

The server used in a broadcast communication system in which any of a plurality of user terminals acquires the transmission right of a first data and transmits the first data and distributes the first data transmitted from the relevant user terminal to the other user terminal of a plurality of user terminals via a communication network includes a user terminal communication bandwidth collecting means for collecting values of the communication bandwidths which a plurality of user terminals can use and storing the values corresponding to the information for identifying the user terminals. The server also includes a first data transmission right management means for giving the transmission right to any of a plurality of user terminals in accordance with the first data transmission right acquiring request from the user terminals and storing the user terminal having the transmission right of the first data. The server also includes a second data storing means for storing the second data transmitted from the user terminals corresponding to the identifying information of user terminals. The server also includes a second data communication bandwidth calculating means for verifying whether the user terminal given the transmission right by the first data transmission right management means is registered by referring to a database indicating correspondence between the user terminals and the communication bandwidths which the relevant user terminals can use, and calculating, when the user terminal given the transmission right of the first data is registered, the value of communication bandwidth which the relevant user can use as the communication bandwidth for transmission of the second data for the user terminal given the transmission right of the first data.

The server also calculates for each user terminal, a value obtained by subtracting the value of communication bandwidth required for transmission of the first data from the value of communication bandwidth which the relevant user terminal can use as the communication bandwidth for transmission of the second data, by also referring, when the user terminal given the transmission right of the first data is not registered, to a database indicating the correspondence between the user terminals and the communication bandwidths which the relevant user terminal can use and setting the communication bandwidth which each user terminal can use as the communication bandwidth for transmission of the second data. The server also includes a second data distributing means for transmitting the second data to each user terminal in the communication bandwidth calculated by the second data communication bandwidth calculating means.

According to another aspect of the present invention, a communication bandwidth control method used in a broadcast communication system in which any of a plurality of user terminals acquires the transmission right of a first data, transmits the first data and distributes the first data transmitted from the relevant user terminal to the other user terminal of a plurality of user terminals via a communication network and collects and stores values of the communication bandwidths which the user terminals can use corresponding to the information for identifying the user terminals. Whether each user terminal is designated as a first data transmitting destination or a second data transmitting destination is determined when the second data is received from the user terminals. Upon a user terminal being designated as the transmitting destination of both first and second data, a value obtained by subtracting the communication bandwidth required for transmission of the first data from the communication bandwidth which the relevant user terminal can use is set as the communication bandwidth for transmission of the second data. Upon a user terminal being designated as the transmitting destination of the second data, the communication bandwidth which the relevant user terminal can use is set as the communication bandwidth for transmitting the second data. According to this method, a receiving condition of the first data and the second data is verified by determining whether the user terminal, as the second data transmitting destination, is designated as the first data transmitting destination. The communication bandwidth for distribution of the second data is controlled in accordance with the receiving condition of each user terminal.

According to another aspect of the present invention, a server to which the communication bandwidth control method is applied includes a server used in a broadcast communication system in which any of a plurality of user terminals acquires the transmission right of first data, transmits the first data and distributes the first data transmitted from the relevant user terminal to the other user terminal of a plurality of user terminals via a communication network and includes a user terminal communication bandwidth collecting means for collecting values of the communication bandwidths which a plurality of user terminals can use and storing the values corresponding to the information for identifying the user terminals. The server also includes a first data transmission right management means for giving the transmission right to any of a plurality of user terminals in accordance with the first data transmission right acquiring request from the user terminals and storing the identifying information of the user terminal given the transmission right of the first data and the identifying information of the user terminal of the first data transmitting destination.

The server also includes a second data storing means for storing a second data transmitted from the user terminals corresponding to the identifying information of user terminal and the identifying information of user terminal of the second data transmitting destination. The server also includes a second data communication bandwidth calculating means for judging whether the relevant user terminal is stored in a first data storing means as the first data transmitting destination for the user terminal of the second data transmitting destination stored corresponding to the second data, calculating a value obtained by subtracting the communication bandwidth required for transmission of the first data from the communication bandwidth which the relevant user terminal can use as the communication bandwidth for transmission of the second data, when the relevant user terminal is stored as the first data transmitting destination. The server also sets the communication bandwidth which each user terminal can use as the communication bandwidth for transmission of the second data when the relevant user terminal is not stored as the first data transmitting destination. The server also includes a second data distributing means for transmitting the second data to the user terminal designated as the second data transmitting destination in the communication bandwidth calculated by the second data communication bandwidth calculating means.

Moreover, the quality of the first data is removed from the influence of the user terminals transmitting the second data. The present invention may also be applied not only to a server, but also to user terminals.

According to another aspect of the present invention, a user terminal used in a broadcast communication system in which any of a plurality of user terminals acquires the transmission right of first data, transmits the first data and distributes the first data transmitted from the relevant user terminal to the other user terminal of a plurality of user terminals and includes a first data transmission right acquiring condition management unit storing the identifying information of the user terminal having the transmission right of the first data among a plurality of user terminals. The terminal also includes a second data transmission bandwidth control means for verifying, for the transmission of a second data, whether an identified user terminal has acquired a transmission right of the first data by referring to the first data transmission right acquiring condition management means.

The terminal also sets a value obtained by subtracting the communication bandwidth required for transmission of the first data from the communication bandwidth of the identified user terminal as the communication bandwidth for transmission of the second data when the transmission right of the first data is already acquired, and sets the communication bandwidth of the identified user terminal as the communication bandwidth for transmission of the second data when the transmission right of the first data is not acquired. The terminal also includes a second data transmitting means for transmitting the second data in the communication bandwidth set by the second data transmission bandwidth control means.

According to another aspect of the present invention, a communication bandwidth control method used in a user terminal of a broadcast communication system in which any of a plurality of user terminals acquires the transmission right of a first data, transmits the first data and distributes the first data transmitted from the relevant user terminal to the other user terminal of a plurality of user terminals via a communication network includes collecting and storing values of communication bandwidths used by user terminals corresponding to the information for identifying user terminals includes verifying whether any of a plurality of user terminals has acquired a transmission right of a first data upon the relevant user terminal requesting and acquiring the transmission right of a second data. When user terminals having acquired the transmission right of the first data exist, the communication bandwidth which the relevant user terminal can use is set as the communication bandwidth for transmitting the second data for the user terminals having acquired the transmission right of the first data. A value obtained by subtracting the communication bandwidth required for transmission of the first data from the communication bandwidth which the relevant user terminal can use is set as the communication bandwidth for transmission of the second data for the user terminals having acquired no transmission right of the first data. When the user terminals having acquired the transmission right of the first data do not exist, the value of the communication bandwidth which the relevant user terminal can use is set as the communication bandwidth for transmission of the second data, and the minimum value of the communication bandwidths for transmission of the second data assigned to user terminals is obtained.

When the user terminals having acquired the transmission right of the second data has also acquired the transmission right of the first data, the value obtained by subtracting the communication bandwidth required for transmission of the first data from the communication bandwidth which the user terminals having acquired the transmission right of the second data is compared with the minimum value obtained, the lesser value is set as the communication bandwidth for transmission of the second data. When the user terminals having the transmission right of the second data do not have the transmission right of the first data, the communication bandwidth which the user terminals having acquired the transmission right of the second data can use is compared with the minimum value obtained, and the lesser value is set as the communication bandwidth of the second data.

This method controls communication bandwidth for transmission of data to user terminals as the second data distribution destination in accordance with the transmission right of the first data when the user terminal transmits the second data.

According to another aspect of the present invention, a user terminal used in a broadcast communication system in which any of a plurality of user terminals acquires the transmission right of a first data, transmits the first data and distributes the first data transmitted from the relevant user terminal to the other user terminal of a plurality of user terminals includes a user terminal communication bandwidth management means for collecting values of the communication bandwidths which a plurality of user terminal can use and storing these values corresponding to the user terminal identifying information. The terminal also includes communication enabling bandwidth setting means for identifying the minimum value of the communication bandwidths collected which the other user terminal can use, comparing the identified minimum value with the communication bandwidth of the own user terminal, setting the minimum value as the own communication enabling bandwidth when the communication bandwidth of the own user terminal is larger, and setting the communication bandwidth of the own user terminal as the own communication enabling bandwidth when the minimum value is larger. The terminal also includes a first data transmission right control means for receiving the first data transmission right acquiring condition notification and storing the identifying information of the user terminal having the transmission right of the first data and a second data transmission right control means for receiving the second data transmission right acquiring condition notification and storing the identifying information of the user terminal having the transmission right of the second data.

The terminal also includes a second data transmitting communication bandwidth control means for verifying, with a first transmission right control means, whether the own user terminal has acquired a transmission right of the first data when it is verified with a second data transmission right control means that the own user terminal has acquired the transmission right of the second data, setting the value obtained by subtracting the communication bandwidth value required for transmission of the first data from the communication bandwidth calculated with the communication enabling bandwidth setting means as the communication bandwidth for transmission of the second data when the own user terminal has acquired the transmission right of the first data. The terminal also includes mean comparing the communication bandwidth which the user terminal having the transmission right of the first data can use with the value obtained by subtracting the communication bandwidth required for reception of the first data from the communication bandwidth of the other user terminal having no transmission right in order to identify the minimum value when the other user terminal has the transmission right of the first data, and setting the value of the communication enabling bandwidth of the own user terminal as the communication bandwidth for transmission of the second data when the communication enabling bandwidth of the own user terminal is smaller as a result of comparison between the identified minimum value and the communication enabling bandwidth of the own user terminal.

The terminal also includes setting the minimum value as the communication bandwidth for transmission of the second data when the minimum value is smaller, and setting the communication enabling bandwidth of the own user terminal calculated with the communication enabling bandwidth determining means as the communication bandwidth for transmission of the second data when any user terminal does not acquire the transmission right of the first data. The terminal also includes a second data transmitting means for transmitting the second data in the communication bandwidth calculated with the second transmitting communication bandwidth control means.

According to another aspect of the present invention, a communication bandwidth control method used in a user terminal of a broadcast communication system in which any of a plurality of user terminals acquires the transmission right of a first data, transmits the first data and distributes the first data transmitted from the relevant user terminal to the other user terminal of a plurality of user terminals via a communication network includes that values of the communication bandwidths which the user terminals can use are collected and stored corresponding to the information for identifying user terminals. The method further includes whether a user terminal designated as the transmitting destination of a second data is designated as the transmitting destination of a first data is determined when the user terminal has acquired the transmission right of the second data, and the value obtained by subtracting the communication bandwidth required for transmission of the first data from the communication bandwidth which the relevant user terminal can use is set as the communication bandwidth for transmission of the second data when the user terminal is designated as the transmitting destination of the first data. The value of the communication bandwidth which the user terminals can use is set as the communication bandwidth for transmission of the second data when the user terminal is not designated as the transmitting destination of the first data and the minimum value of the communication bandwidths assigned to user terminals is obtained. The method further includes that the value obtained by subtracting the communication bandwidth required for transmission of the first data from the communication bandwidth which the user terminals having acquired the transmission right of the second data is compared with the minimum value obtained and the smaller value is set as the communication bandwidth for transmission of the second data when the user terminals having acquired the transmission right of the second data has also acquired the transmission right of the first data. The communication bandwidth which the user terminals having acquired the transmission right of the second data can use is compared with the minimum value obtained and the smaller value is set as the communication bandwidth of the second data when the user terminals having acquired the transmission right of the second data do not acquired the transmission right of the first data.

According to another aspect of the present invention, the method described above is applied to a user terminal used in a broadcast communication system in which any of a plurality of user terminals acquires the transmission right of a first data, transmits the first data and distributes the first data transmitted from the relevant user terminal to the other user terminal of a plurality of user terminals comprising a user terminal communication bandwidth management means for collecting the communication bandwidth values which each user terminal can use and storing these values corresponding to the information for identifying the user terminals and includes a first data transmission right control means for receiving the first data transmission right acquiring condition notification and storing the identifying information of the user terminal having the first data transmission right and the identifying information of the user terminal of the first data transmitting destination. The user terminal also includes a second data transmission right control means for receiving the second data transmission right acquiring condition notification and storing the identifying information of the user terminal having the second data transmission right, and a second data transmitting communication bandwidth control means for verifying whether the user terminal designated as the second data transmitting destination is designated as the first data transmitting destination when the second data transmission right is obtained, and setting the value obtained by subtracting the communication bandwidth required for transmission of the first data from the communication bandwidth which the relevant user terminal can use as the communication bandwidth for transmission of the second data when the user terminal is designated as the first data transmitting destination. The terminal also includes means setting the value of the communication bandwidth which the user terminal can use as the communication bandwidth for transmission of the second data when the user terminal is not designated as the first data transmitting destination and obtaining the minimum value of the communication bandwidths assigned to each user terminal, and comparing the value obtained by subtracting the communication bandwidth required for transmission of the first data from the communication bandwidth which the user terminal having the transmission right of the second data can use with the minimum value and setting the smaller value as the communication bandwidth for transmission of the second data when the user terminal having the transmission right of the second data has the transmission right of the first data.

The terminal also includes means comparing the communication bandwidth which the user terminal having the transmission right of the second data can use with the minimum value and setting the smaller value as the communication bandwidth for transmission of the second data when the user terminal having the transmission right of the second data does no have the transmission right of the first data, and second data transmitting means for transmitting the second data in the communication bandwidth calculated with the second data transmitting communication bandwidth control means.

For a user terminal as described above, the second data can be transmitted and received without giving any influence on the quality of the first data in the user terminal side even when the server does not have the function for controlling the communication bandwidth.

According to an aspect of the present invention, the second data other than the first data can be transmitted and received without any deterioration in quality of the first data in the broadcast communication system in which any of a plurality of user terminals acquires the transmission right of the first data, transmits the first data, and distributes the first data transmitted from the relevant user terminal to the other user terminals of a plurality of user terminals via a communication network.

In addition, even if a communication bandwidth which the user terminals can use is different for each user terminal, the limited communication bandwidth can be used effectively since the communication bandwidth can be set, without relation to the communication bandwidths of the other user terminals, in accordance with the communication bandwidth, which the user terminals can use, for each user terminal. Moreover, since the second data can be distributed to the user terminals in the communication bandwidth which the user terminals can use, deterioration in the communication quality of the first data can be eliminated even if an illegal user terminal transmits intentionally a large amount of the second data. In addition, a user terminal having the transmission right of the second data is capable of effectively using the communication bandwidth when the second data is uploaded to the server.

Moreover, when the user terminal having acquired the transmission right of the second data is going to transmit the second data to the other user terminals, the communication bandwidth for transmission of the second data is set by calculating the communication bandwidths for the other user terminals which can be used for transmission of the second data, then comparing these bandwidths and then extracting the minimum communication bandwidth value and thereafter comparing the minimum value with the communication bandwidth which the user terminal having the transmission right of the second data can use for transmission of the second data. Accordingly, if the communication bandwidths which the user terminals can use are different from each other, the second data is never transmitted exceeding the communication bandwidth which the user terminal can use and the second data can be transmitted and received without deterioration in transmission quality of the first data.

Particularly, in the case where the first data is voice and picture data, communication may be realized while the information other than the voice and picture data is transmitted and received. In this case, deterioration in the quality of voice and picture data due to the transmission and reception of the information other than the voice and picture data can be prevented.

According to an aspect of the present invention, a system broadcasts communication among a plurality of terminals by, for example, a voice signal generated from one terminal is broadcast to the other terminals, on the IP (Internet Protocol) network. Accordingly, at the time of broadcast communication, voice data communication and data other than the voice data, such as picture and text, can be transmitted and received simultaneously. Further, the communication bandwidth for transmission and reception of the data other than the voice data can be controlled in accordance with transmission and reception of voice data. Therefore, data other than the voice data can be transmitted and received effectively without deterioration in the quality of voice communication voices during broadcast communication.

FIG. 1 illustrates an example of a broadcast communication system according to an aspect of the present invention.

The broadcast communication system includes a plurality of terminals 1T1, 1T2, . . . hereinafter, a terminal is generally expressed as "terminal 1T") which are connected via a server 1S for management and control of the broadcast communication and various networks 1N1, 1N2, 1N3, 1N4, . . . (hereinafter, a network is generally expressed as "network 1N"). The terminal 1T and server 1S are connected for communication via various networks 1Ns. The network 1N1 and the network 1N2 may be a wireless communication network such as cellular phones. Moreover, the network 1N3 may be a wired network such as a LAN (Local Area Network).

The server 1S includes an IP communication unit 100, a PTT processing unit 101, a user management unit 310, and a PTT management unit 110.

The IP communication unit 100 is an interface for transmitting the information to the network 1N from the server 1S and acquiring the information from the network 1N.

The PTT processing unit 101 is a processing unit for executing the processes designated by a command through interpretation thereof when the command received from the IP communication unit 100 is an instruction relating to the broadcast communication system.

The user management unit 310 is a database storing the information for users.

The PTT management unit 110 is a database storing the application condition of the broadcast communication system.

Each terminal 1T includes an IP communication unit 200, a voice data control unit 203, a PTT processing unit 201, a voice recording unit 206, and a user interface unit 204.

The IP communication unit 200 is an interface for transmitting the information to the network 1N from the terminal 1T and acquiring the information from the network 1N.

The voice data control unit 203 is a processing unit for conducting the processes such as encoding/decoding of the voice data to be transmitted and received.

The PTT processing unit 201 generates a command for the broadcast communication system transmitted to the server 1S by accepting user inputs from the terminal 1T via the user interface unit 204 and executes the command through interpretation for the broadcast communication system received from the server 1S.

The voice recording unit 206 is provided for management of the terminal 1T having acquired the right to speak in the conference room to which the terminal 1T participates.

The user interface unit 204 displays various menus for utilizing the broadcast communication system on the display area of the terminal 1T, acquires contents of input from the menus displayed on the display unit and from the contents of input keys selected, and notifies such contents to the PTT processing unit 201.

An example flow of the broadcast communication system is described with reference to FIG. 2 to FIG. 6.

Users of the terminal 1T acquire a user ID for utilizing the broadcast communication system and are registered to the user management unit 310 together with the user information. An example of the user management unit 310 is illustrated in FIG. 5. The user management unit 310 includes various items such as user ID 51, display name 52, name 53, address 54, etc. The user ID 51 is the user ID required for a user to utilize the broadcast communication system and is set uniquely in the broadcast system. The display name 52 is the name to be displayed for displaying a list of users. The items to be registered to the user management unit 310 may be determined with a system manager or an administrator. The name 53 and address 54, etc. indicated in FIG. 5 are examples of the items requested for registration as the user information from the system manager or administrator. The system manager or administrator is capable of urging the user to input the other necessary items such as company name or section. These items may be associated with an existing individual information database.

In the following example, broadcast communication among a terminal 1T1 (user: ichiro horio), a terminal 1T2 (user: jiro ohno), and a terminal 1T3 (user: saburo okuyama) is assumed.

Figure 3:
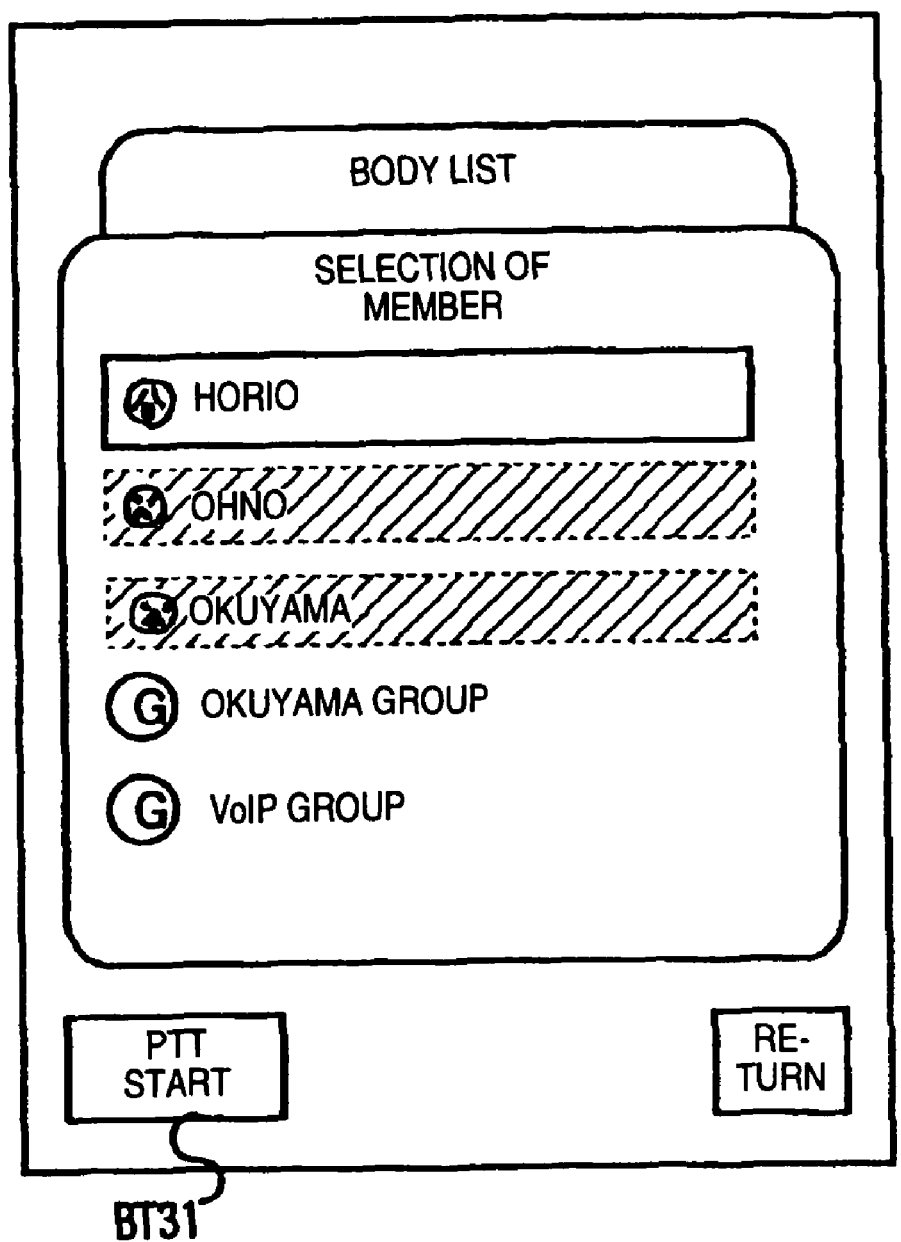
FIG. 3 is a block diagram illustrating an example of a display format.

When the user acts to display a menu of the broadcast communication service at the terminal 1T1, the user interface unit 204 displays a user list for designating partners for making broadcast communication, as illustrated in FIG. 3. In this user list, the users who are capable of utilizing the broadcast communication service are displayed with the display names 52 registered to the user management unit 310. This user list is also capable of displaying all users subscribed to the broadcast communication service. It is also possible that only those users requested by a user for each terminal among the users participating to the broadcast communication service are selectively registered and only the registered users are display in the list.

Moreover, it is possible to form groups of users, a name being given to each group, and the selected group name is displayed. The "Okuyama group" and "VoIP group" displayed in the member selection display format of FIG. 3 are examples of a display of the group name. When the group name is selected, all users corresponding to the group are selected or the users registered in the group are displayed one time in the list, and thereafter members are selected from the list.

Moreover, it is also possible to display a conference room name from among conference rooms to which the users of the terminal 1T are registered as members, or to display a conference room name from among the conference rooms that are temporarily open. When the conference room name is selected and the PTT start button BT31 is selected, the selected conference room name and the user ID of the terminal 1T are provided to the PTT processing unit 201. The PTT processing unit 201 generates a PTT participation statement command and provides this command to the server 1S via the IP communication unit 201. The PTT participation statement command includes an identifier indicating the PTT participation statement command and a conference ID for identifying the conference room for participation.

A user of the terminal 1T identifies partners requested for broadcast communication from the user list displayed on the display screen. Moreover, when the user selects the PTT start button BT31, the selected users and the information indicating that the PTT start button BT31 is selected are provided to the PTT processing unit 201 via the user interface unit 204. The PTT processing unit 201 generates a PTT start command and transmits this command to the server 1S via the IP communication unit 200. The PTT start command includes an identifier indicating the PTT start request and a user ID of the designated partner. Since "ohno" and "okuyama" are selected in the example of FIG. 3, the user IDs of "ohno" and "okuyama" are obtained with reference to the user management unit 310 to generate the PTT start command and this PTT start command is transmitted to the server 1S.

The server 1S generates, upon reception of the PTT start command transmitted from the terminal 1T1 (Yes in operation 2010 of FIG. 2), a conference room for broadcast communication. When the conference room is generated, a conference room ID is generated to identify the relevant conference room. In this example, "PocSes001" is generated as the conference room ID. The information for management and control of the conference room corresponding to the generated conference room ID is registered to the PTT management unit 110 (2020 of FIG. 2).

An example of a PTT management unit 110 is illustrated in FIG. 6. The PTT management unit 101 conference room ID information 61, member information 62, participant information 63, and voice information 64. In the conference room ID information 61, a generated conference room ID is set. In the member information 62, a user ID of the user who is recognized as the participant to the relevant conference room is registered. When the PTT start command is received, the user ID designated by the PTT start command is set as the user who is recognized as the participant for the relevant conference room. In the participant information 63, the user ID of the user who is actually participating to the conference room is set. In voice information 64, the user ID of the terminal 1T which is recognized for voice is set on the basis of the voice request command transmitted from the user who is participating to the conference room. Moreover, when the conference room is permanently open, the conference room ID and the user ID recognized to participate in this conference room are always registered to the member column until the permanent conference room is deleted. For, example, the conference room information of the conference room ID: PoCSes901 illustrated in FIG. 6 is the permanently open conference room and three users of the user ID: abc@ffPoC.com, user ID: bcd@ddPoC.com, and the user ID: efg@ppPoC.com are registered as the members. In the illustrated example, a user is not currently participating in the conference room. However, since the conference room is a permanently open conference room, the conference room information is still registered with the PTT management unit 110.

The PTT processing unit 101 guides a user (user ID: horio@fujipoc.com) of the terminal 1T1 to the generated conference room (conference room ID: SesPoc001) and sets the user ID: horio@fujipoc.com of the terminal 1T1 to the item of the participant 63 of the conference room ID: "PoCSes001" of the PTT management unit 110. Moreover, the PTT processing unit 101 notifies terminal 1 of information such as a conference room ID of a conference room being opened and an address and a port number of a server which are required for transmission of data to the conference room (2030 of FIG. 2).

The PTT processing unit 101 verifies whether a communication partner designated with the PTT start command is in the condition to enable the IP communication.

Figure 2:
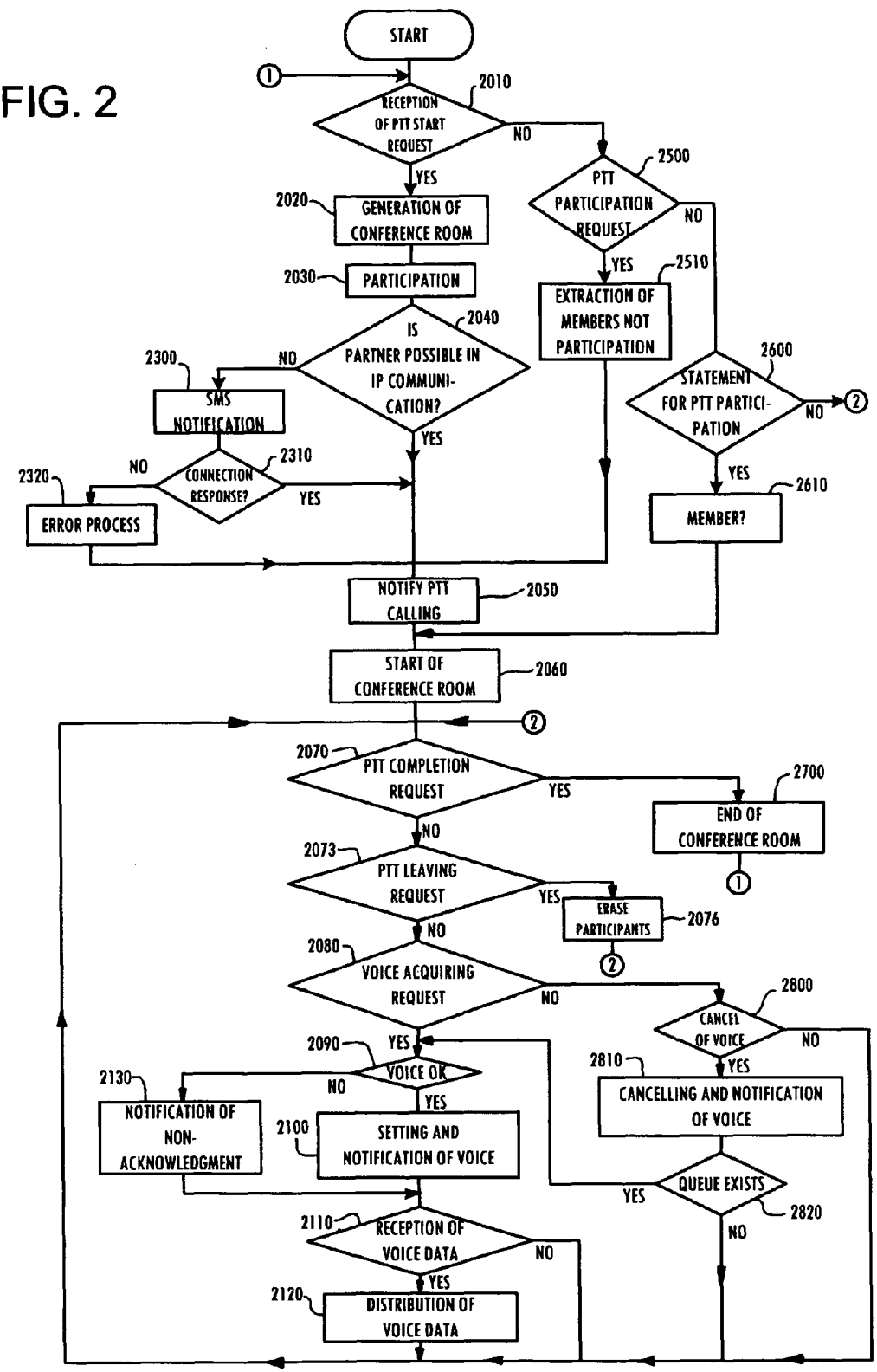
FIG. 2 is a flow chart illustrating an operation of the broadcast communication system.

When the terminal 1T of the communication partner is in a condition to enable the IP communication (Yes in operation 2040 of FIG. 2), the terminal 1T transmits a PTT calling command (2050 of FIG. 2). The PTT calling command includes an identifier indicating the PTT calling command, a conference room ID, address and port number of the server for transmitting the voice data, and a member name. For example, when the terminal 1T3 (user: okuyama) is in the condition to enable the IP communication, "PoCSes001" is set to the item of the conference room ID of the PTT calling command, the address and port number of the server are set to the item of the address and port number of the server, and the user IDs: horio@fujipoc.com, ohno@fujipoc.com and okuyama@fujipoc.com of users who are recognized to participate to this conference room are set to the item of member, and these are transmitted to the terminal 1T3 from the server 1S (2050 of FIG. 2).

When the terminal 1T of the communication partner is not in a condition to enable the IP communication (No in operation 2040 of FIG. 2), a message requesting execution of the connection process, to set the condition to enable the IP communication with a protocol which is different from the IP, is transmitted to the terminal 1T of the communication partner. For example, when the terminal 1T2 (user: Ohno) is not in a condition to enable IP communication, the server 1S transmits the message instructing an execution of the connecting process to set the condition to enable the IP communication by making use of a SMS (short message system) to the terminal 1T2. The terminal 1T2, having received the message instructing execution of the connecting process to set the condition to enable the IP communication, executes the connecting process for the IP communication and sends a message indicating completion of the connecting process to the server 1S.

When the terminal 1T verifies the condition to enable the IP communication (Yes in operation 2310 of FIG. 2), this terminal transmits the PTT calling command to the terminal 1T2 (2050 of FIG. 2). If the condition to enable the IP communication cannot be verified (No in 2310 of FIG. 2), an error process is performed. As an example of the error process, a message "connection failure" is sent to the other terminals of the participants, or the connecting message is repeatedly transmitted so a condition to enable IP communications can be attained.

When the command received from the terminal 1T is not the PTT start command (No in operation 2010 of FIG. 2), the server 1S determines whether the command received from the terminal 1T is the PTT participation request command. When the command is the PTT participation request command (Yes in 2500 of FIG. 2), the member 62 being stored corresponding to the conference room ID designated in the PTT participation request command is compared with contents of the participant 63 to extract the users who are members but are not participating to the conference room (2510 of FIG. 2). The PTT calling command is transmitted to the extracted users (20509 of FIG. 2).

When the command received from the terminal is not the PTT participation request command (No in operation 2500 of FIG. 2), whether the command received from the terminal is the PTT participation statement command is determined. When the command received from the terminal is the PTT participation statement command (Yes in operation 2600 of FIG. 2), whether the user having transmitted the participation statement command is registered to the member 62, which is stored corresponding to the conference room ID designated with the participation statement command, is verified with reference to the PTT management unit 110. When the user is registered as the member, this user is guided to participate in the conference room.

The terminals 1T2, 1T3, having received the PTT calling command, participate in the conference room by storing the conference room ID, address and port number of the server for transmitting the voice data, and member name set in the PTT calling command in the storage unit (2060 of FIG. 2).

The PTT processing unit 101 registers the user IDs of the terminals 1T2, 1T3 as participants in participant 63 of the conference room ID: PoCSes001 of the PTT management unit 110.

Figure 4:
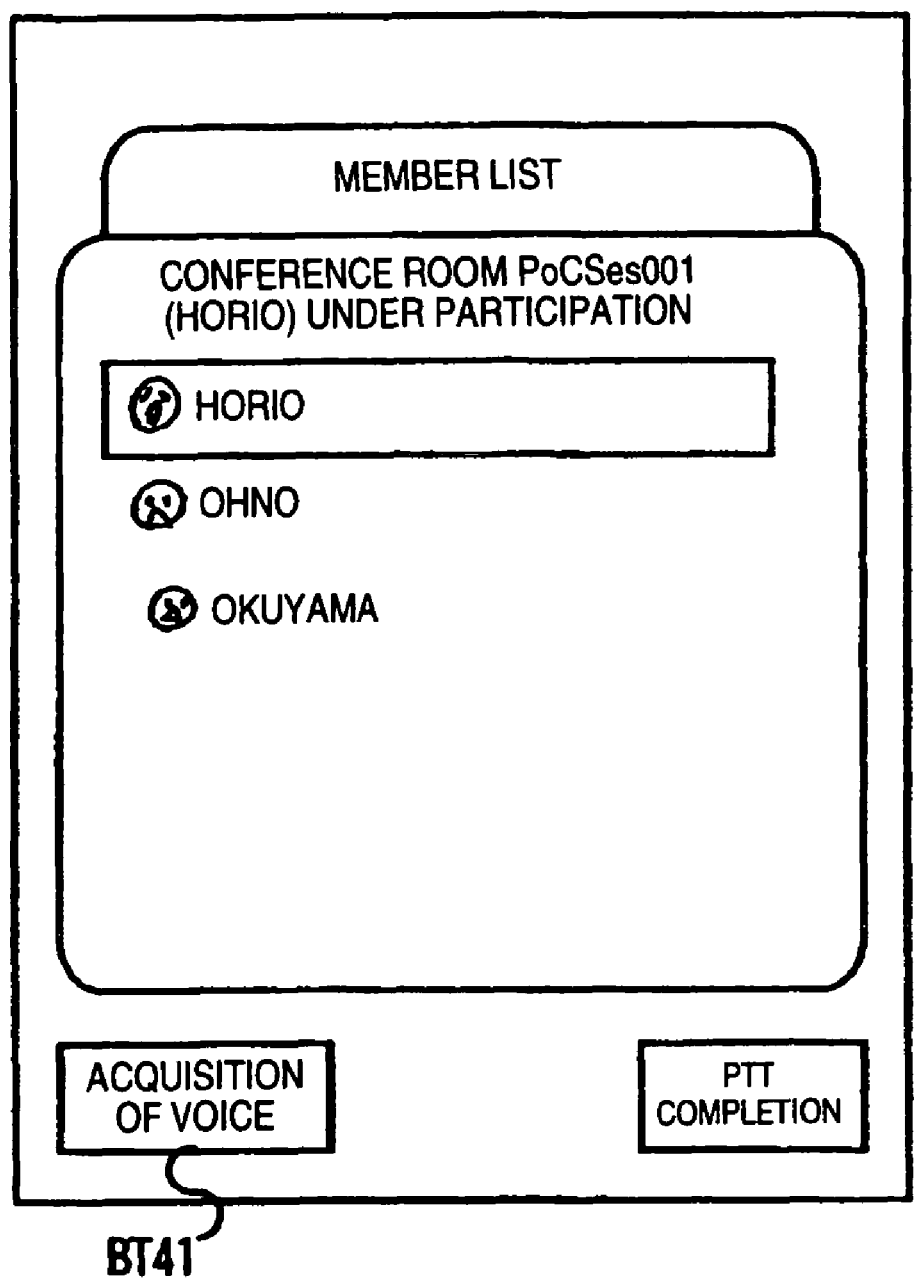
FIG. 4 is a block diagram illustrating an example of a display format.

Accordingly, the broadcast communications by three parties of, for example, user names "horio", "ohno", and "okuyama" occurs in the conference room of the conference room ID: PoCSes001. FIG. 4 illustrates an example of a display format on the terminal 1T when the broadcast communication becomes possible. The user: horio of the terminal 1T, who has issued the PTT start command, is displayed in the first line of a user list. The users: ohno and okuyama, designated as the communication partners are also displayed to the next and subsequent lines of the list as the users who are simultaneously communicating in this conference room.

Upon reception of a PTT completion request (Yes in 2070 of FIG. 2), the PTT processing unit 101 completes the conference. When the conference room designated in the PTT completion request is permanently opened, all user IDs registered to participant 63 of the PTT management unit 110 are deleted. If the conference room designated in the PTT completion request is not the permanently open conference room, information of the conference room stored and designated in the PTT management unit 110 is deleted (2700 of FIG. 2).

If the PTT completion request is not yet received (No in 2070 of FIG. 2), whether a PTT leaving command is received is verified. When the PTT leaving command is received (Yes in 2073 of FIG. 2), the leaving user ID is deleted from the participant information 63, of the conference room ID stored in the PTT management unit, on the basis of the conference room ID designated in the PTT leaving command and the leaving user ID (2076 of FIG. 2).

If the PTT leaving request is not yet received (No in 2073 of FIG. 2), whether a voice acquiring request has been received is judged. When the terminal 1T wants to acquire the voice data, a user of the terminal 1T is requested to select the voice acquiring button BT41 on the display format (FIG. 4) displayed on the terminal 1T. The user interface unit 204 notifies the PTT processing unit 201 that the voice acquiring button BT41 is selected. The PTT processing unit 201 generates a voice acquiring request command and then transmits this command to the server 1S.

When the server 1S has received the voice acquiring request (Yes in 2080 of FIG. 2), the PTT processing unit 101 determines whether it is possible to provide the voice data. When it is possible to provide the voice data (Yes in 2090 of FIG. 2), the user ID of the terminal 1T having requested the voice data is registered, or the user ID is updated in the voice information 63 of the relevant conference room ID of the PTT management unit 110, and sent to the terminal 1T having requested the voice data that the voice data has been obtained. Moreover, the user ID of the terminal 1T having acquired the voice data is provided to the other terminals 1T participating in the same conference room (2100 of FIG. 2). In this case, the terminal 1T stores upon reception of the notification that the voice data has been obtained, or upon notification of the user ID having acquired the voice data, the user ID of the terminal 1T having acquired the voice data to the voice recording unit 206. If it is not possible to provide voice data in the process of the server 1S (No in 2090 of FIG. 2), the voice requesting terminal 1T is notified that the voice cannot be obtained, or a process is performed to register the voice requesting terminal 1T in a queue for acquiring the voice (2130 of FIG. 2).

When the voice data is received from the terminal 1T having acquired the voice (Yes in 2110 of FIG. 2), the user ID of a user who does not have the voice data is extracted from among the user IDs of the participants stored in the relevant conference room ID of the PTT management unit 110. Thee voice data received is transmitted to the terminal of the relevant user ID (2120 of FIG. 2).

When the command received from the terminal 1T is not the voice acquiring request (No. in 2080 of FIG. 2), whether the command received from the terminal 1T is a voice canceling command is determined.

When the voice canceling command is received (Yes in 2800 of FIG. 2), the PTT processing unit 101 deletes the user ID designated from the item of voice 63 of the conference room ID stored in the PTT management unit 110 on the basis of the conference room ID and user ID for canceling the voice designated in the voice canceling command. Moreover, a message informing whether the voice data request is cancelled is sent to the terminal 1T participating to the relevant conference room (2800 of FIG. 2). Upon reception of the message indicating the voice request has been cancelled from the server 1S, the content recorded in the voice recording unit 206 is deleted. Moreover, the server 1S determines whether the terminal 1T waiting for the voice data is registered in the waiting queue. When the terminal 1T is registered to the queue (Yes in 2820 of FIG. 2), whether the voice should be given is determined by returning to the step 2090.

Broadcast communication can occur among a plurality of terminals according to the procedures described above.

Next, a method of communication bandwidth control for transmission of reception of data other than voice data while the broadcast communication is conducted is described.

In the following description of the example embodiments, the elements having the functions similar to those described above are designated with the similar reference numerals and the identical descriptions are omitted.

According to an example first embodiment, an example of controlling the communication bandwidth for transmission of data other than the voice data from the terminal side is described.

Figure 7:
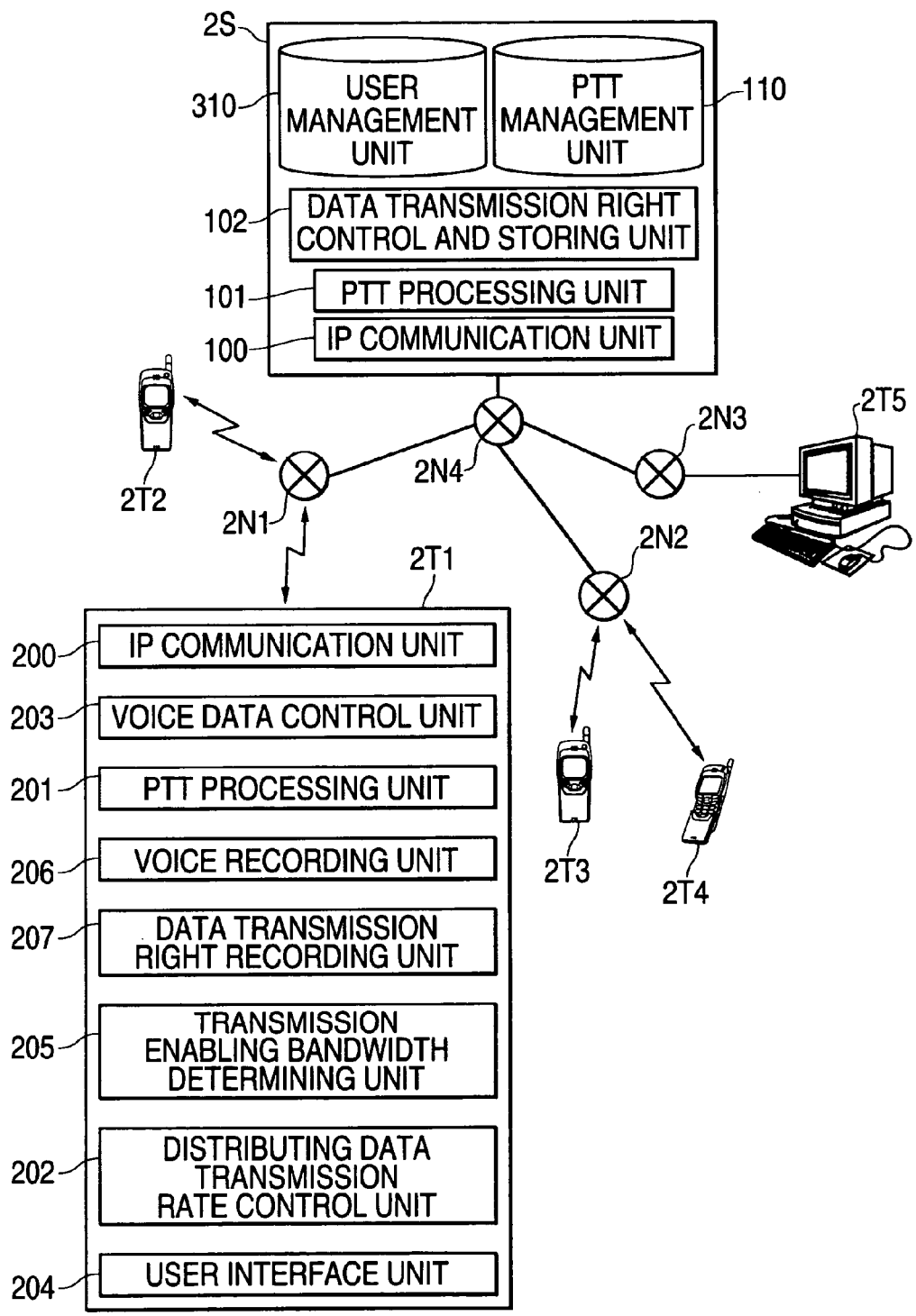
FIG. 7 is a block diagram illustrating an example first embodiment of a of a broadcast communication system acceding to the present invention.

FIG. 7 illustrates an example first embodiment.

A server 2S for controlling the broadcast communication among a plurality of terminals 2T1, 2T2, 2T3, 2T4, . . . (hereinafter, generally referred to as a "terminal 2T) connected for enabling the communication via various networks 2N1, 2N2, . . . (hereinafter, generally referred to as "network 2N") is illustrated. For example, a network 2N1 as a cellular phone network provided by a cellular phone company A, a communication system CDMA 1× (Code Division Multiple Access 1×) system, network 2N2 as cellular phone communication network provided by a cellular phone company B, and a communication system as the PHS (Personal Handyphone System) system are illustrated. Moreover, the example network 2N3 is a wired network such as a LAN (Local Area Network). The server 2S for management of the broadcast communication is connected to each network 2N1, 2N2, . . . via the network such as the LAN.

The server 2S also includes a data transmission right control/recording unit 102 in addition to items included in server 1S described above. The data transmission right control/storage unit 102 controls providing a data transmission right to the terminal 2T or canceling the transmission right. Moreover, the terminal 2T also includes, in addition to the items included in the terminal 1T described above a data transmission right recording unit 207, a distributing data transmission rate control unit 202, and a transmission enabling bandwidth determining means 205. The data transmission right recording unit 207 stores the information indicating acquisition of the transmission right when the terminal 2T requests the transmission right to the server 2S and then receives the message indicating the data transmission right is given from the server 2S. The distributing data transmission rate control unit 202 controls the communication bandwidth for transmission of data in accordance with the communication condition in the conference room. The transmission enabling bandwidth determining unit 205 collects the information of the communication bandwidths of the terminals of the other users participating in the conference room and calculates the communication bandwidth for transmission.

For example, broadcast communication by the terminal 2T1 (user: horio) with the terminal 2T2 (user: ohno) and the terminal 2T3 (user: okuyama) is assumed. With execution of operations 2010 to 2050 illustrated in FIG. 2, broadcast communications by three parties can be started.

Figure 8:
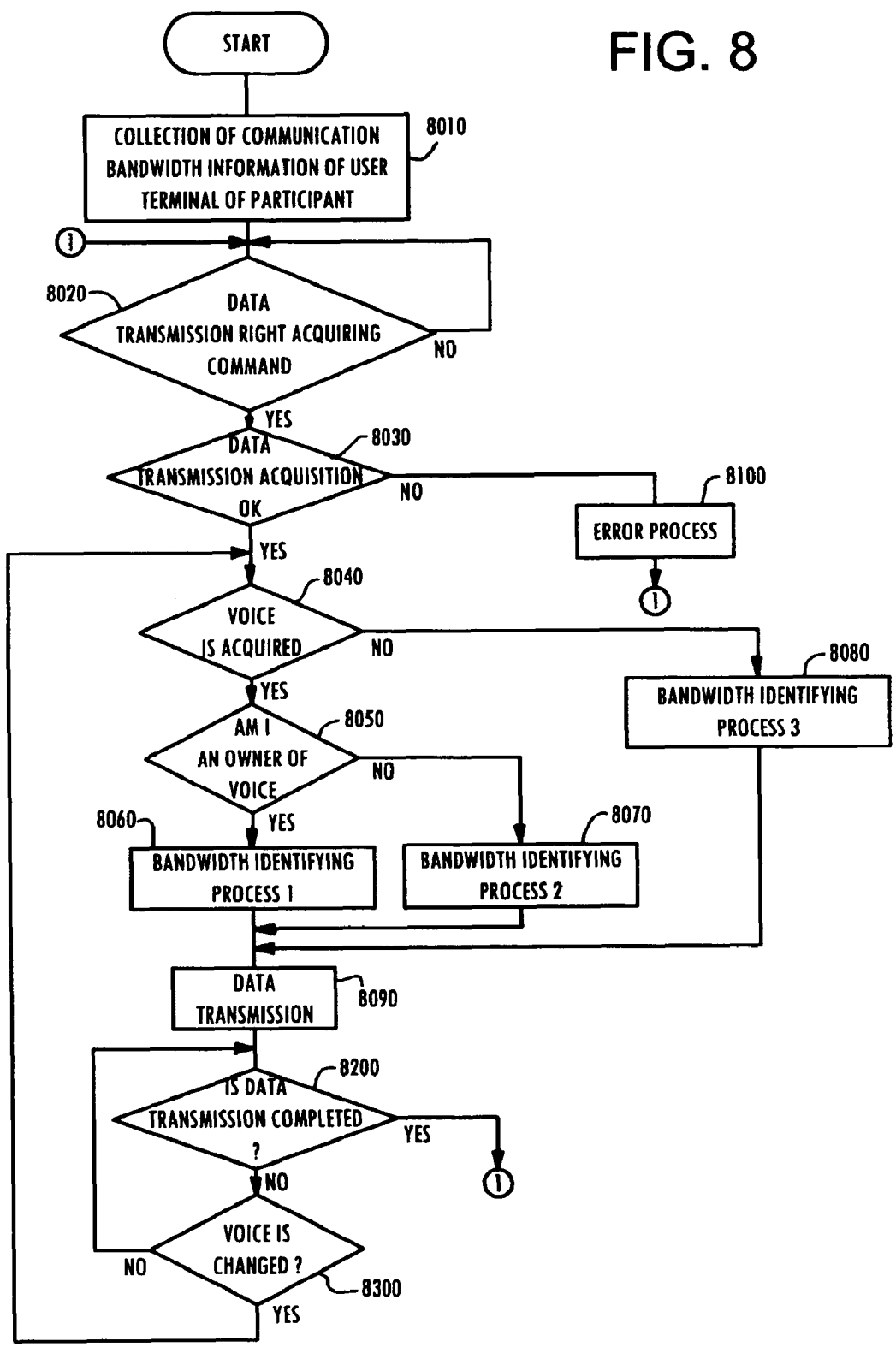
FIG. 8 is a flowchart illustrating an example, of communication bandwidth control according to the first embodiment.

The terminal 2T1 acquires, when it participates in the conference room, information regarding the communication bandwidths of the other terminals from the other terminals 2T2, 2T3 which are also participating in the conference room (8010 of FIG. 8). Example information regarding the communication bandwidths includes the up-stream and down-stream bandwidths and minimum guaranteed up-stream and down-stream bandwidths. In this example, "up-stream" refers to the transmission of data toward the server 2S from the terminal 2T, while "down-stream" refers to the transmission of data toward the terminal 2T from the server 2S. This definition also applies in the example second embodiment. The terminal 2T2 is connected to the network 2N1 and the communication system is the CDMA 1× system. Therefore, information regarding communication bandwidth, e.g., the up-stream communication bandwidth of 64 kpbs, down-stream communication bandwidth of 144 kbps, minimum guarantee bandwidth of up-stream of 9.6 kpbs, and minimum guarantee bandwidth of down-stream of 9.6 kpbs is acquired. Moreover, since the terminal 2T3 is connected to the network 2N2 and the communication system is a PHS system the information regarding communication bandwidth, e.g., the up-stream communication bandwidth of 64 kpbs, down-stream communication bandwidth of 64 kpbs, minimum guaranteed bandwidth of up-stream of 64 kpbs, and the minimum guarantee bandwidth of down-stream of 64 kpbs are acquired.

Transmission of a picture taken by the terminal 2T1 to the other participants of the conference room while terminal 2T1 is participating in the conference room (conference room ID: PoCSes001) will be described as an example.

Figure 9:
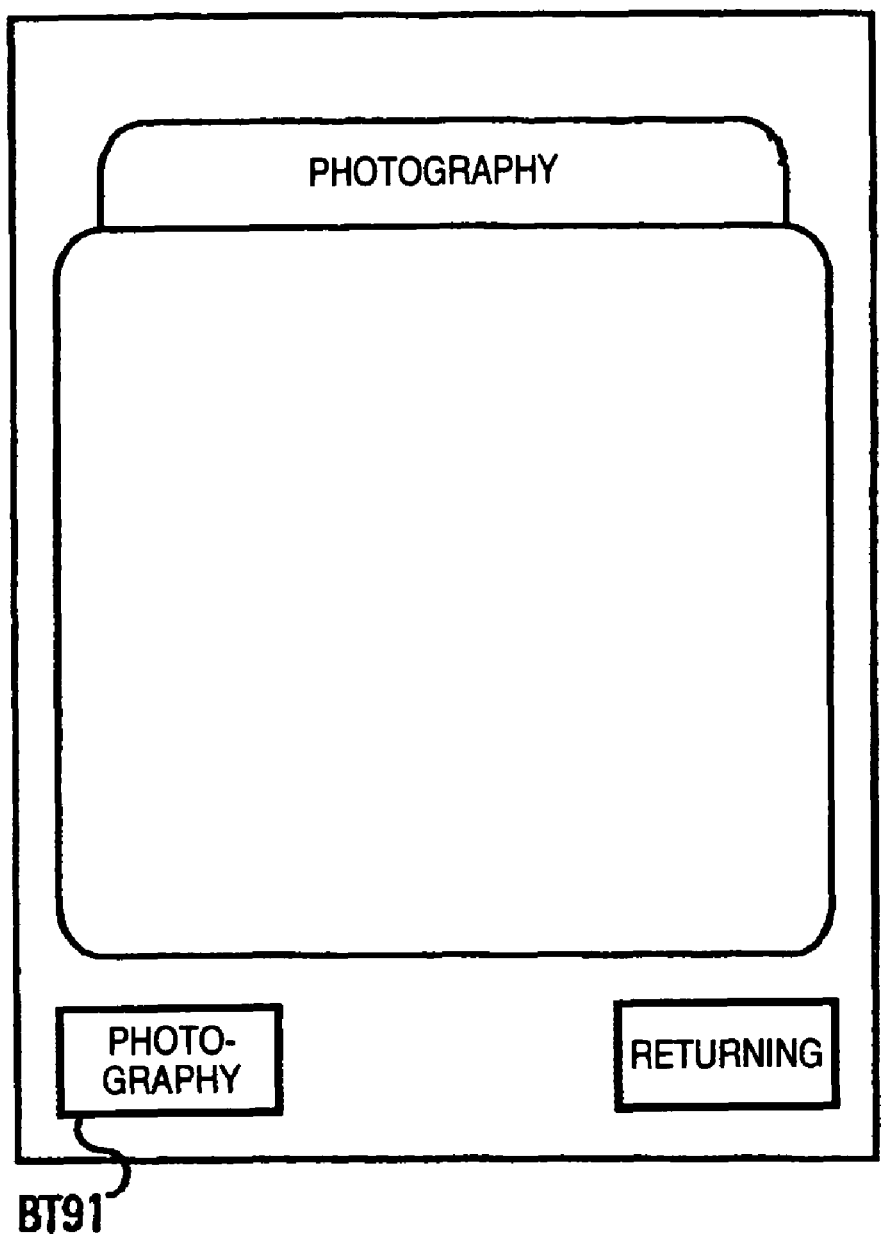
FIG. 9 is a block diagram illustrating an example of a display format.
Figure 10:
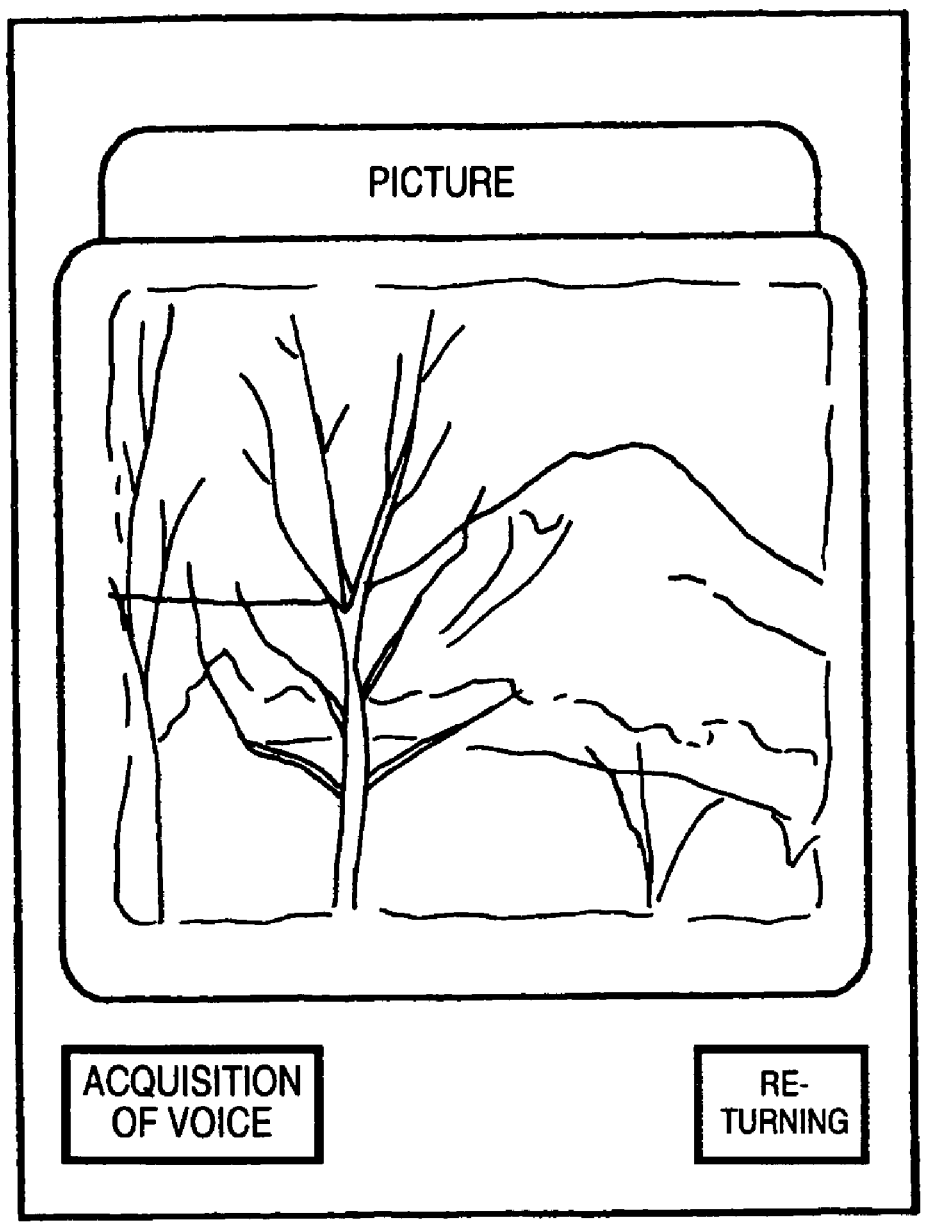
FIG. 10 is a block diagram illustrating another example of a display format.

FIG. 9 illustrates a display example on a display screen for photography. In this example, a menu for photography is included into a menu of the broadcast communication system and pictures obtained are distributed to the other terminals. It is also possible, in addition to this example, to upload pictures obtained by other means.

When a camera is directed at an object and a photography button BT91 is selected in the terminal 2T1, a picture of the object is generated and a request of a data transmission right for transmitting the generated picture data to the other terminals 2T2, 2T3 is transmitted to the server 2S (8020 of FIG. 8). The server 2S records the user ID of the terminal 2T which is recognized to have the data transmission right and also notifies acknowledgment of the data transmission right to the request generating terminal 2T1. The terminal 2T1 verifies, upon reception of acknowledgment of data transmission right (Yes in 8030 of FIG. 8), whether the terminal using voice in the conference room to which the relevant terminal 2T1 is also participating exists.

When the terminal using voice exists (Yes in 8040 of FIG. 8), it is verified whether the terminal 2T using voice is the terminal 2T1 having a data transmission right.

When the terminal 2T1 having the data transmission right has acquired the voice data (Yes in 8050 of FIG. 8), the bandwidth of the data transmission is determined by the following example procedures.

When the terminal 2T1 has acquired both a data transmission right and voice, only the terminal 2T1 transmits both voice data and other data in the conference room. The other terminals 2T2, 2T3 participating in the conference room only receive the voice data communication and the data other than the voice data. Therefore, the up-stream communication bandwidth of the terminal 2T1 is compared with a minimum communication bandwidth among the down-stream communication bandwidths of the other terminals 2T2, 2T3 participating in the conference room. When the up-stream communication bandwidth of the terminal 2T1 is greater than the minimum communication bandwidth among the down-stream communication bandwidths of the other terminals 2T2, 2T3, the value of the minimum communication bandwidth among the down-stream communication bandwidths is calculated as the transmission enabling communication bandwidth of the terminal 2T1. A communication bandwidth for data transmission is determined by subtracting the bandwidth used for voice communication from this calculated transmission enabling bandwidth.

When the minimum communication bandwidth among the down-stream communication bandwidths of the other terminals 2T2, 2T3 is greater than the up-stream communication bandwidth of the terminal 2T1, the value of the up-stream communication bandwidth of the terminal 2T1 is calculated as the transmission enabling communication bandwidth of the terminal 2T1. The transmission bandwidth for data transmission is obtained by subtracting the bandwidth used for transmission of voice data from this calculated transmission enabling bandwidth.

An example follows. Since the terminals 2T1, 2T2 are connected to the network 2N1 and the communication system is the CDMA 1× system, the up-stream communication bandwidth is 64 kbps, the down-stream communication bandwidth is 144 kbps, the minimum guaranteed bandwidth for up-stream communications is 9.6 kbps, and the minimum guaranteed bandwidth for down-stream is 9.6 kbps. Since the terminal 2T3 is connected to the network 2N2 and the communication system is a PHS system, as the information of the communication bandwidth, the up-stream communication bandwidth is 64 kbps, down-stream communication bandwidth is 64 kbps, the minimum guaranteed bandwidth of up-stream is 64 kbps, and the minimum guaranteed bandwidth of down-stream is 64 kbps. The minimum guaranteed bandwidths down-stream of the terminals 2T2 and 2T3 respectively are 9.6 kbps and 64 kbps and the minimum value is 9.6 kbps.

Since the minimum guaranteed bandwidth of 9.6 kpbs up-stream of the terminal 2T1 is equal to the minimum guaranteed bandwidth of 9.6 kbps down-stream of the terminals 2T2 and 2T3, the transmission enabling bandwidth of the terminal 2T1 is calculated as 9.6 kbps. The bandwidth for transmission of voice data is determined with the voice data compression system (CODEC) and transmission interval. In this example, a communication bandwidth of 5.9 kbps is required for transmission of the voice data. Since the terminal 2T1 uses voice, it is required to acquire a bandwidth for transmission of the voice data. Therefore, the communication bandwidth for transmission of data is calculated as 3.7 kbps, which is equal to the remainder of the bandwidth after subtraction of the bandwidth for transmission of voice data of 5.9 kbps from the transmission enabling bandwidth of 9.6 kbps (8060 of FIG. 8).

When the terminal 2T having the data transmission right does not have a voice transmission right (No in 8050 of FIG. 8), the bandwidth for data transmission is determined in accordance with the following example.

In this case, the terminal 2T has only a data transmission right and transmits the data with an up-stream communication bandwidth and receives the voice data from the other terminal 2T with a down-stream communication bandwidth. The terminal 2T using only voice transmits the voice data with the up-stream communication bandwidth and receives the data with the down-stream communication bandwidth. The terminal 2T having neither a voice nor data transmission right receives both the voice data and the data other than the voice data with a down-stream communication bandwidth without a use of an up-stream communication bandwidth.

As described above, the down-stream communication bandwidth varies in accordance with acquisition of a voice and data transmission right. Therefore, a minimum communication bandwidth is determined as a bandwidth for data transmission by comparing an up-stream communication bandwidth of the terminal having the data transmission right, the down-stream communication bandwidth of the terminal using voice, and a value for the bandwidth obtained by subtracting the bandwidth required for reception of voice data from the down-stream communication bandwidth of the terminal not having a right for voice and data transmission (8070 of FIG. 8).

When any of the terminals 2T participating in the conference room does not have a voice transmission right (No in 8040 of FIG. 8), a bandwidth of the data transmission is determined in the following example sequence.

The minimum down-stream communication bandwidth among the down-stream communication bandwidths of the terminals 2T having no data transmission right participating in the conference room is compared with the up-stream communication bandwidth of the terminal having a data transmission right. When the minimum down-stream communication bandwidth is greater, the value of the up-stream communication bandwidth of the relevant terminal is calculated as the transmission bandwidth for data transmission. When the transmission bandwidth of the terminal having the data transmission right is greater, the value of the minimum down-stream communication bandwidth is calculated as the transmission bandwidth for data transmission (8080 of FIG. 8).

The data other than the voice data is transmitted to the server 2S on the basis of the transmission bandwidth determined by the above sequence (8090 of FIG. 8).

The data other than the voice data transmitted is transmitted via the server 2S to the other terminals 2T participating in the conference room in the communication bandwidth determined in the terminal side.

The PTT processing unit 101 supervises whether data transmission has been completed. If data transmission is not yet completed (No in 8200 of FIG. 8), whether a use of voice has changed is verified. When the use of voice has changed (Yes in 8300 of FIG. 8), the value of the communication bandwidth is reviewed by returning to operation 8040 and the data is subsequently transmitted with the reviewed communication bandwidth in operation 8090. Accordingly, since a value of the communication bandwidth for distribution of data may be changed in accordance with change of use of voice, the transmission rate of the data other than the voice data can be changed in accordance with change in the amount of voice data transmitted and received.

For example, when voice data is acquired and the data other than the voice data is transmitted during transmission of the voice data, the data other than the voice data is distributed at the beginning with the small communication bandwidth. However, when the voice is lost, the transmission rate of data can be raised by increasing the communication bandwidth. On the other hand, since only the data other than the voice data is transmitted at the beginning, such data has been transmitted with the available maximum communication bandwidth. However, if voice data is acquired during transmission of the data and thereby the voice data is distributed, the communication bandwidth for data distribution is changed to a value obtained by subtracting a value of a bandwidth for the voice data.

Therefore, since the data is subsequently distributed by changing the communication bandwidth to a smaller value, the communication bandwidth for distribution of voice data is acquired with a priority given for distribution of the voice data that is generated non-periodically regardless of the existence of distribution of data other than the voice data. Accordingly, broadcast communication are realized without deterioration of the quality of voice data. The operations from 8200 to 8300 are examples and added as required, and these functions are not essential functions.

According to a second embodiment of the present invention, an example of a control in the server side for the communication bandwidth for transmission of data other than the voice data will be described.

Figure 11:
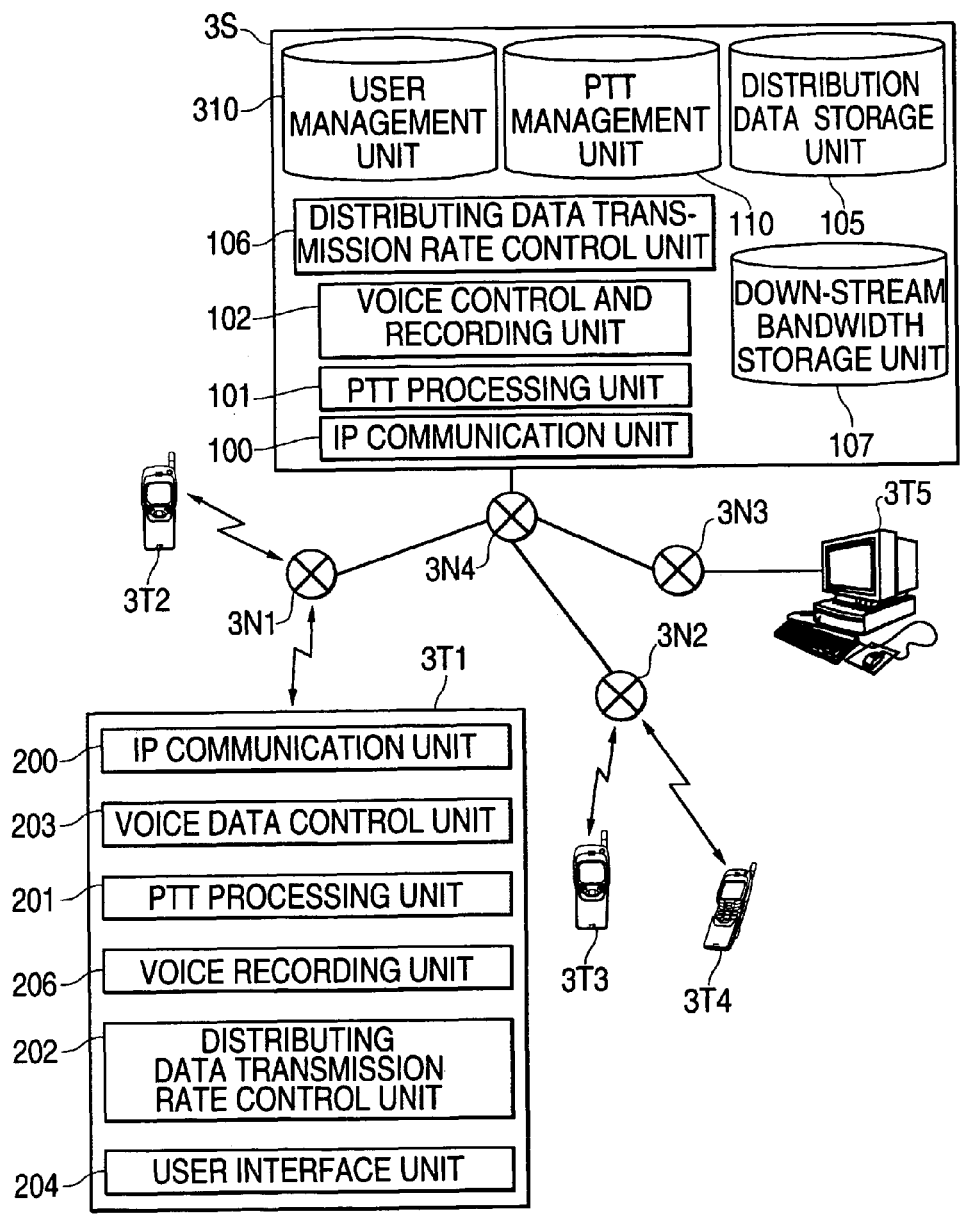
FIG. 11 is a block diagram illustrating an example of a broadcast communication system according to a second embodiment of the present invention.

FIG. 11 is a block diagram illustrating a second embodiment.

A server 3S for controlling the broadcast communication among a plurality of terminals and a plurality of terminals 3T1, 3T2, 3T3, 3T4, . . . (hereinafter a terminal is generally called a "terminal 3T" in some cases) are provided for communications via various networks 3N1, 3N2 . . . hereinafter a network is generally called a "network 3N" in some cases). For example, it is assumed that a network 3N1 is a cellular phone communication network provided by the cellular phone company A and the communication system is a CDMA 1× system, while the network 3N2 is the cellular phone communication network provided by the cellular phone company B and the communication system is the PHS system. The network 2N3 is a wired network such as a LAN (Local Area Network). The server 3S for management of the broadcast communication is connected with the networks 3N1, 3N2, . . . via the LAN.

The server 3S is further provided with a down-stream bandwidth storage unit 107, a distributing data transmitting rate control unit 106, and a distribution data storage unit 105, in addition to those described for server 1S. The down-stream bandwidth storage unit 107 acquires and stores information of the communication bandwidth of the terminals 3T participating in the conference room. The distributing data transmitting rate control unit 106 determines when any of the terminals 3T transmits the data, the communication rate for each terminal 3T for distribution of data to the other terminals 3T. The distribution data storage unit 105 stores the data transmitted from the terminal 3T corresponding to the data transmitting terminal 3T for each conference room. Moreover, the terminal 3T is further provided with the distributing data transmitting rate control unit 202 in addition to the functions of the terminals 1T described above.

Figure 12:
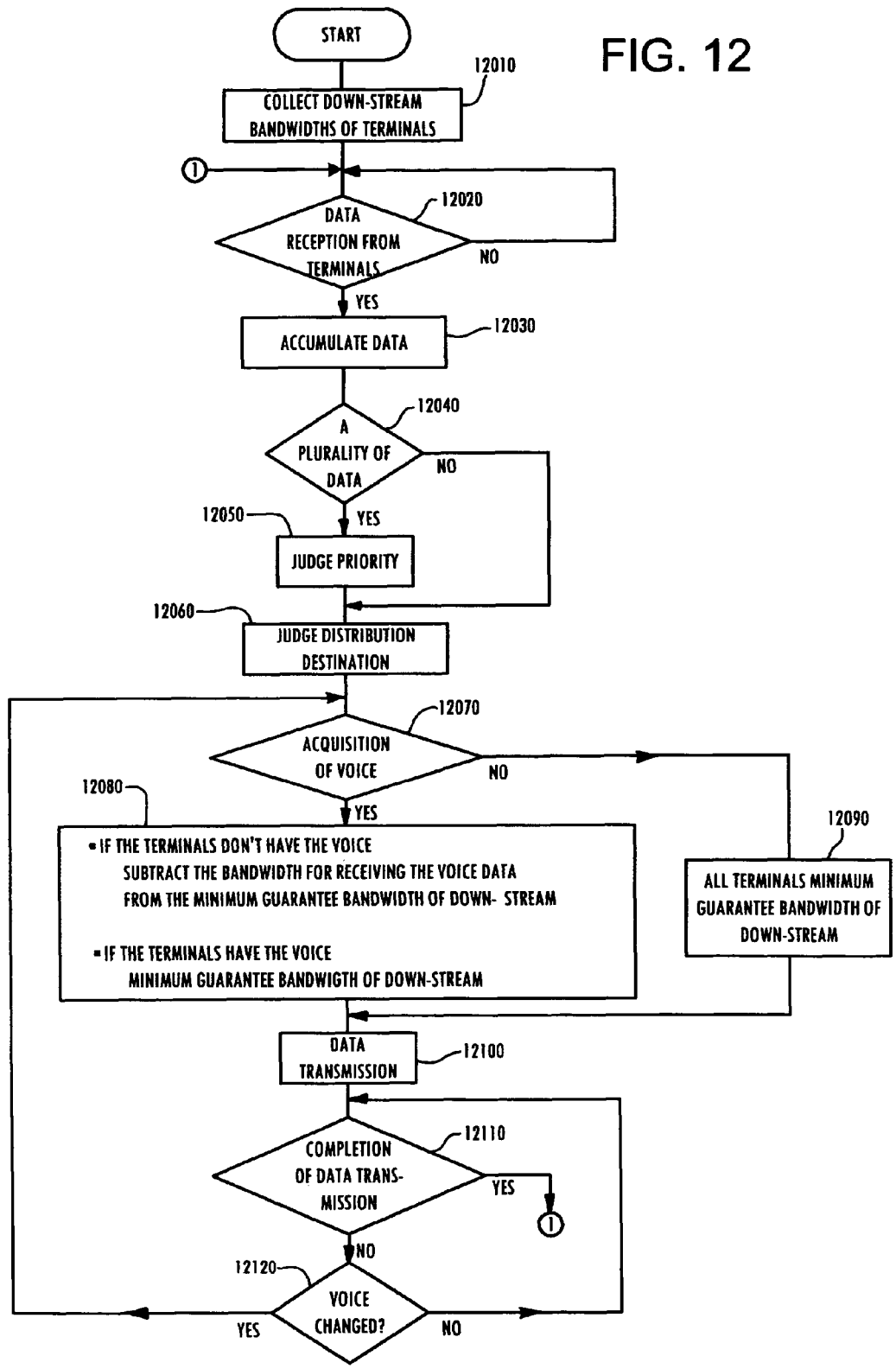
FIG. 12 is a flow chart illustrating processes for communication bandwidth control according to a second embodiment of the present invention.

The PTT processing unit 101 collects the values of communication bandwidths to be used in the terminal 3T of the users who can participate to the PTT system and stores the values corresponding to the terminals 3T (1201 of FIG. 12). An example of the down-stream bandwidth storage unit 107 is illustrated in FIG. 13. The down-stream bandwidth storage unit 107 includes a participant 131 and down-stream bandwidth 132. The user ID of the participant participating in the conference room is set in participant information 131. A value of the down-stream communication bandwidth of the terminal 3T of the participant is set in the down-stream bandwidth 132. Collection of values of the down-stream communication bandwidths may be realized when a terminal has registered an application of the PTT system, or whenever participation is conducted in the conference room of the PTT system, or whenever a terminal has acquired voice and data transmission rights, or when the data received from a terminal is distributed to the other terminals.

When the communication bandwidth to be used by the terminal changes in accordance with the condition of the communication network, the communication bandwidth can be controlled in accordance with a change in the condition of the communication network by collecting the information of the communication bandwidth which can be used by each terminal particularly when the voice and data transmission rights can be acquired or when the data is distributed to each terminal. Moreover, the down-stream bandwidth storage unit 107 may be formed independently or may be administrated by providing an data to a user management unit 310 and a PTT management unit 110.

Figure 15:
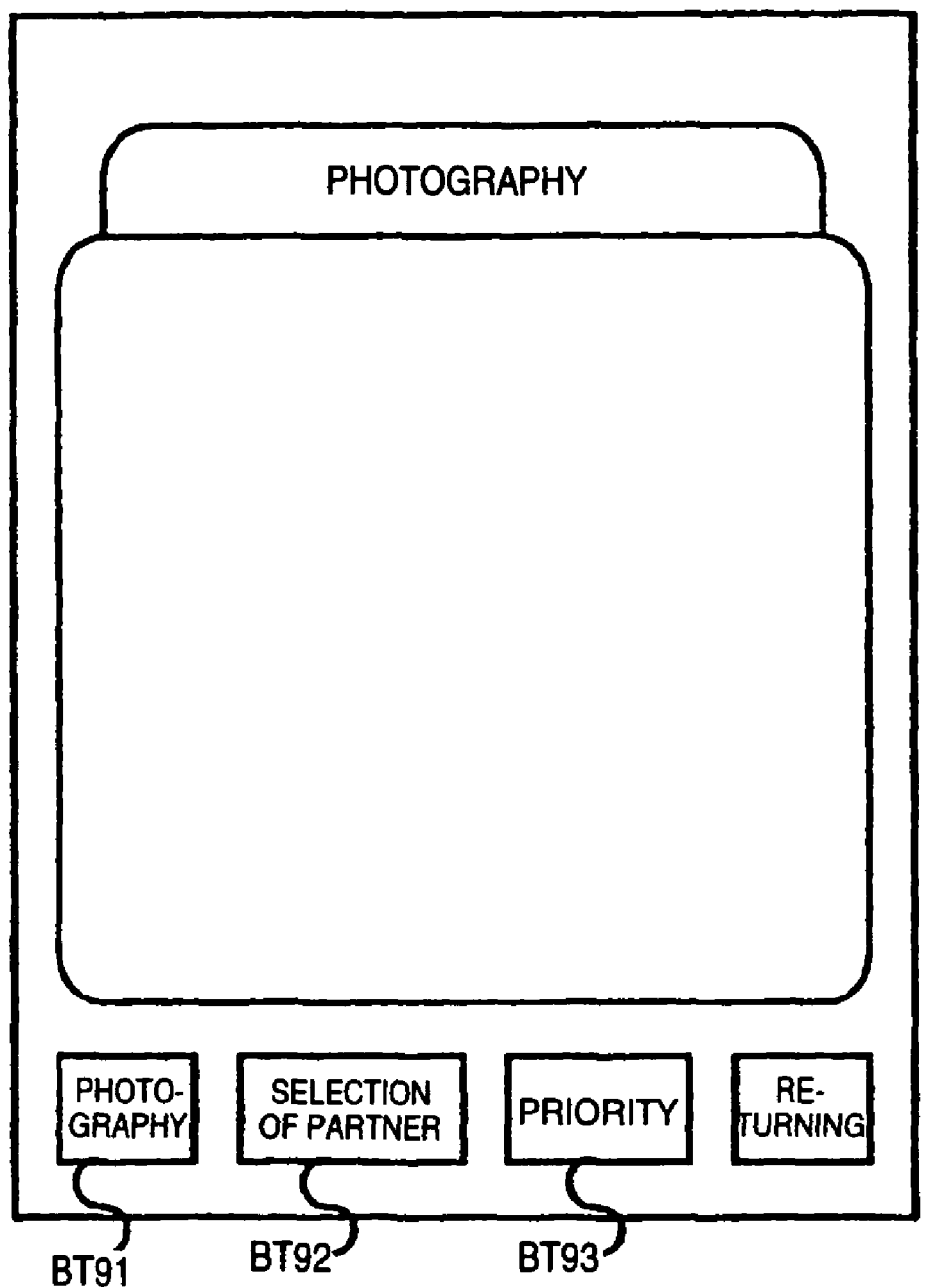
FIG. 15 is a block diagram illustrating an example of display format.

An example of transmission of pictures by a terminal 3T1 (user: horio) by participating in the conference room (conference room ID: PoCSes001) will be described. A display format (FIG. 15) for taking pictures is displayed on the terminal 3T1, requesting the user action. The user action for photography is similar to that in the example first embodiment. Moreover, in the example of FIG. 15, transmitting destination and priority may be designated at the time of transmitting the data other than the voice data. When a partner selecting button BT92 is selected, the transmitting destination can be designated. As the transmitting destination, for example, designation is possible to transmit the data to all members of the conference room or of participants or to transmit the data to a part of the members of the conference and the participants thereto. In the case where the data is transmitted to a part of the members and participants of the conference, the user IDs of the members as the transmitting destination and the participants are designated. When a priority button BT93 is selected, the priority can be designated. As the priority, the priority of data distribution is designated and a priority level is set allowing discrimination thereof.

The distributing data transmitting rate control unit 202 determines the transmission bandwidth of data when the relevant terminal 3T transmits the data other than the voice data. When the data transmitting operation is performed at the terminal 3T, whether the terminal 3T has acquired the voice is verified by referring to the voice recording unit 206. If the voice is acquired, the bandwidth obtained by subtracting the bandwidth required for transmission of voice data from the minimum guarantee bandwidth of upstream of the terminal 3T is set as the communication bandwidth for transmission of data. If voice is not acquired, the minimum guarantee bandwidth of up-stream of the terminal is set as the communication bandwidth for transmission of data. In this example, the upper limit of the communication bandwidth of the terminal 3T is set as the minimum guaranteed bandwidth and the bandwidth required for voice data is subtracted from the minimum guaranteed bandwidth.

However, it is also possible to subtract the bandwidth required for voice data with reference to the communication bandwidth which may be used by the terminal 3T in place of the minimum guaranteed bandwidth. In this case, since not only voice data and the data other than the voice data, but also control data for the broadcast communication system and the control data for communication network, are transmitted and received, the communication bandwidth for such control data must also be considered. When both the minimum guaranteed bandwidth and the communication bandwidth which may be used by the terminal 3T are used for transmission and reception of voice data and the data other than the voice data, the communication bandwidth of the control data is not guaranteed probably resulting in delay of the control data. However, for effective application of the communication bandwidth, in some cases a communication bandwidth of the terminal 3T which is generally larger than the minimum guarantee bandwidth is used. It is also possible to vary a reference communication bandwidth. For example, a minimum guaranteed bandwidth is used in accordance with amount of data to be transmitted, and the communication bandwidth which may be used by the terminal 3T is set as the reference bandwidth, or selected through a switching operation. Such variations may be applied in the other example embodiments.

The data other than the voice data is transmitted to the server 3S in the communication bandwidth determined as described above.

The server 3S stores, upon reception of the data other than the voice data transmitted from the terminal 3T (12020 of FIG. 12), this data to the distribution data storage unit 105 corresponding to the identifiers of the terminals (12030 of FIG. 12). When the transmitting destination and priority of data are transmitted together with the data other than the voice data transmitted from the terminal 3T, these information pieces are also stored corresponding to the data. FIG. 14 illustrates an example of the distribution data storage unit 105. The distribution data storage unit 105 includes a conference room ID 141, a transmitting source user 142, a transmitting destination user 143, a priority 144, a class of data 145, a capacity 146, and a content 147. The conference room ID to which the data has been transmitted is set in the conference room ID 141. The user ID of the terminal 3T having transmitted the data is set transmitting source user 142. The user ID of the transmitting destination designated at the time of transmission of the data or the information indicating that members of the conference room are all object of distribution is set transmitting destination user 143. The priority designated at the time of transmission of data is set in priority 144. A class of data or a class of file transmitted from the terminal 3T is set in item of class of data 145. A capacity of data transmitted from the terminal 3T is set capacity 146. A content of data transmitted from the terminal 3T or address of storing destination of the storage unit of the server 3S is set in content 147.

For the control of distribution data in the server 3S, the data transmission right is not required to be limited only to one terminal. Even during the data transmission of the other terminals, data transmission can be realized to the terminals which are requesting the data transmission.

In the example of FIG. 14, distribution data is stored in the conference room having the conference room ID: PoC-Ses001. The first data is the data in which the transmitting source user 142 has the user ID: horio@fujipoc.com. The transmitting destination of this data is "all members of participants of the conference room" and the priority 144 is designated as "Usual". The class of data 145 is "JPEG", capacity of data 146 is "1 MB", content of data 147 is stored in the file name "ABC.JPEG". The second data is the data in which the transmitting source user 142 has the user ID: okuyama@fujipoc.com. As the transmitting destination of this data 143, only the "user ID: ohno@fujipoc.com" is designated. Priority 144 is "Urgent". The class of data 145 is "IM-MSG", capacity 146 is "1 KB", and content of data 147 is "Please call me later" which is the content of the message being stored.

When a plurality of data of the same conference room is stored in the distribution data storage unit 105 (Yes in 12040 of FIG. 12), the data distribution sequence is judged (12050 of FIG. 12). A determination is conducted, for example, with the following example operations:

a) Data having higher priority is selected on the basis of the priority designated when the data is transmitted from the terminal.

b) Data having the least capacity is selected by comparing the capacity of data.

c) Data for the greatest number of users is designated as the distributing destination is selected.

d) Data having higher priority is selected by judging the priority level through combination of above conditions is selected.

When the data as the distribution object is determined, a transmitting destination 143 stored corresponding to the data is acquired (12060 of FIG. 12).

Moreover, the communication bandwidth for transmission of data is determined in the following example sequence.

Whether any of participants of the conference room has acquired the voice in the conference room as the object is verified. When the data transmitting destination is designated to a part of the participants in place of all members of participants in the conference room, the user ID of the transmitting destination is identified by referring to the transmitting destination user 143 stored in the distribution data storage unit 105 and the following determination is made for the identified user ID.

When the voice is not acquired (Yes in 12070 of FIG. 12), the minimum guaranteed bandwidths down-stream are all set as the transmission bandwidth of data for the terminal having acquired the voice, while the value obtained by subtracting the bandwidth for receiving the voice data from the minimum guaranteed bandwidth of down-stream is set as the transmission bandwidth for terminals which don't have voice (12080 of FIG. 12). If the voice is not acquired (No in 12070 of FIG. 12), the minimum guaranteed bandwidth of down-stream of each terminal is set as the transmission bandwidth of data (12090 of FIG. 12).

Data is distributed to each terminal on the basis of the transmission bandwidth being set for each terminal 3T (12100 of FIG. 12). Accordingly, even if the communication bandwidth of terminal 3T is different, data is distributed in accordance with the communication bandwidth of each terminal 3T.

The PTT processing unit 101 supervises whether the data distribution has been completed. If data distribution is not yet completed (No in 12110 of FIG. 12), whether the voice has been changed is verified. When the voice is changed (Yes in 12120 of FIG. 12), the communication bandwidth is reviewed by returning to operation 12070. In operation 12110, the data is transmitted subsequently with the reviewed communication bandwidth. Accordingly, since the value of communication bandwidth for distribution of data may be changed in accordance with change in the voice, the transmission rate of the data other than the voice data can be changed in accordance with change in the amount of transmission and reception of the voice data. For example, when voice is acquired and the data other than the voice data is transmitted during transmission of the voice data, the data other than the voice data is distributed with a lower communication bandwidth at the beginning. However, if the voice is lost completely, the data transmission rate may be raised with expansion of the communication bandwidth. Since only the data other than the voice data has been transmitted at the beginning, the data has been transmitted in the maximum communication bandwidth in the usable bandwidths.

However, if the voice is acquired during transmission of data and the voice data is also distributed, the communication bandwidth for data distribution is changed to a value obtained by subtracting the bandwidth for voice data. Therefore, since the data is subsequently distributed by changing the communication bandwidth to a smaller value, the communication bandwidth for distribution of voice data is acquired with priority for distribution of voice data, which is generated non-periodically, without relation to distribution of data other than the voice data. Thus, broadcast communications may be realized without a decrease in the quality of voice data. The operations 12110-12120 may adding additional functions as required.

The first example embodiment describes an example in which the voice data is distributed to all terminals participating in the conference room and only the data other than the voice data is distributed to some of the terminals. In the third example embodiment, however, an example of transmitting the voice data to some of the terminals will be described.

The third example embodiment describes an example of controlling the communication bandwidth for transmission of the data for terminal 2T as in the case of the first embodiment.

The system structure of the third example embodiment is assumed to be identical to the system structure of the first embodiment illustrated in FIG. 7. Moreover, it is also assumed that the broadcast communication by four parties may be conducted after the terminal 2T1 (user: horio) designates three parties of the terminal 2T2 (user: ohno), terminal 2T3 (user: okuyama) and terminal (user: ikeda).

An example flow of the processes of the broadcast communication system from operation 2010-2073 of FIG. 2 is identical to that up to the operations 2110-2120 and from operations 2800-2820. The processes different from that illustrated in FIG. 2 (operations 2080, 2090, 2100, 2130) will be described with reference to FIG. 16.

The display format of a list of the names of four members including the user of a terminal 2T1 is displayed on the terminal 2T1. When the terminal 2T1 issues a request for the voice, the user of the terminal 2T1 identifies partners for sending the speech and selects the voice acquisition button BT41 on the display format (FIG. 17) displayed from the user interface unit 204. In this example, only the member of the display name: ohno among the four members is selected as the partner for sending the speech. The user interface unit 204 of the terminal 2T transmits the information indicating that the voice acquisition button BT41 is selected and the user ID of the selected member to the PTT processing unit 201. The PTT processing unit 201 generates a voice acquisition request command on the basis of the information received from the user interface unit 204 and sends this command to the server 2S via the IP communication unit 200.

Figure 16:
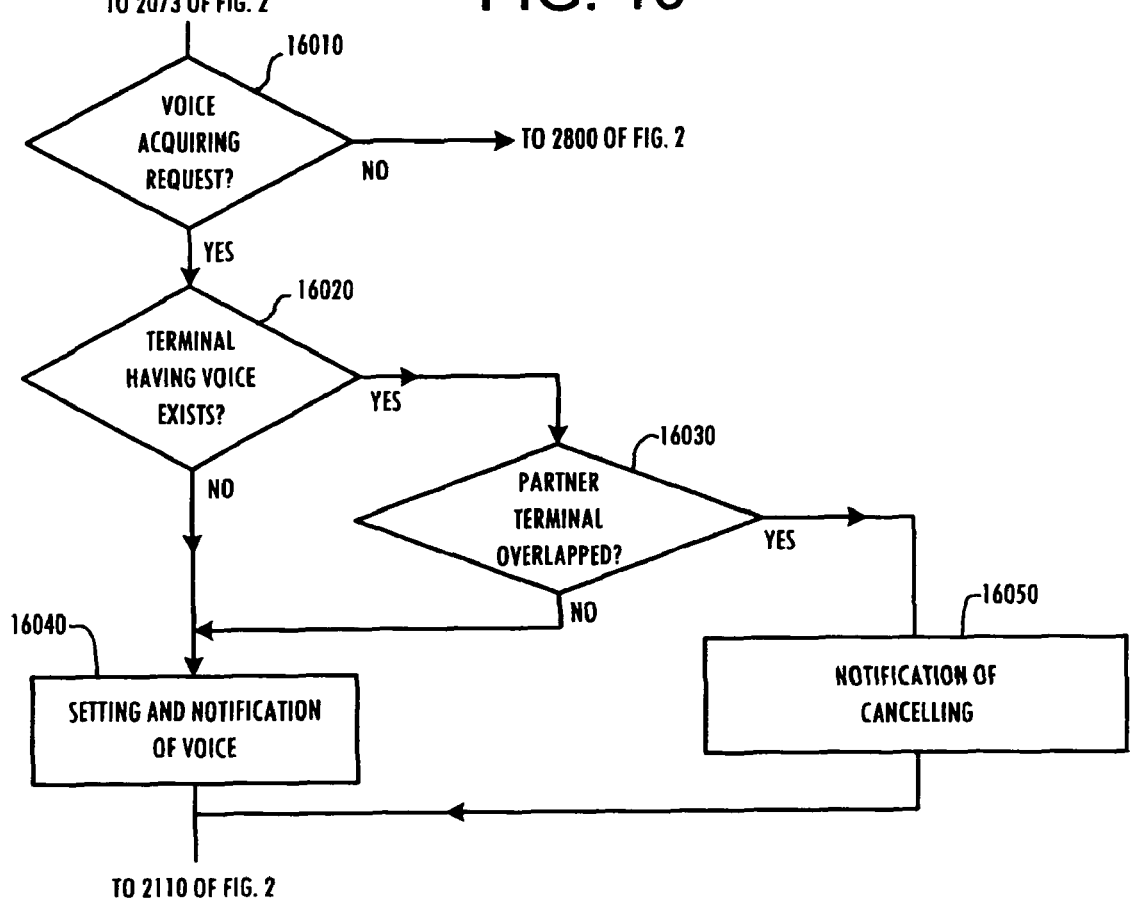
FIG. 16 is a flow chart illustrating voice control processes of the broadcast communication system.

The PTT processing unit 101 of the server 2S determines, upon reception of the voice acquisition request command from the terminal 2T via the IP communication unit 100 (Yes in 16010 of FIG. 16), whether the terminal 2T having acquired the voice exists by referring to the PTT management unit 110 (16020 of FIG. 16). When the command received from the terminal 2T is not the voice acquiring request command (No in 16010 of FIG. 16), the process shifts to the operation 2800 of FIG. 2.

An example of the PTT management unit 110 in this embodiment is illustrated in FIG. 21. In this embodiment, voice information 64 further includes voice owner 65 and partner information 66. In voice owner information 65, the user ID of the user having acquired the voice is set and in the partner information 66, the user ID of the user designated with the voice acquiring request command is set.

When the terminal 2T having acquired voice exists (Yes in 16020 of FIG. 16), whether the user ID of the terminal 2T of the partner designated in the voice acquiring request command is already registered to the partner 66 of the terminal 2T having the voice is verified by referring to the PTT management unit 110.

When the user ID is already registered to the partner 66 (Yes, in 16030 of FIG. 16), the request for the voice is rejected and it is notified to the requesting terminal 2T (16050 of FIG. 16). If the user ID is not registered to the partner 66 (Yes in 16030 of FIG. 16), the voice is given, it is registered to the PTT management unit 110, and acquisition of the voice is notified to the requesting terminal 2T (16040 of FIG. 16).

Figures 17, 18:
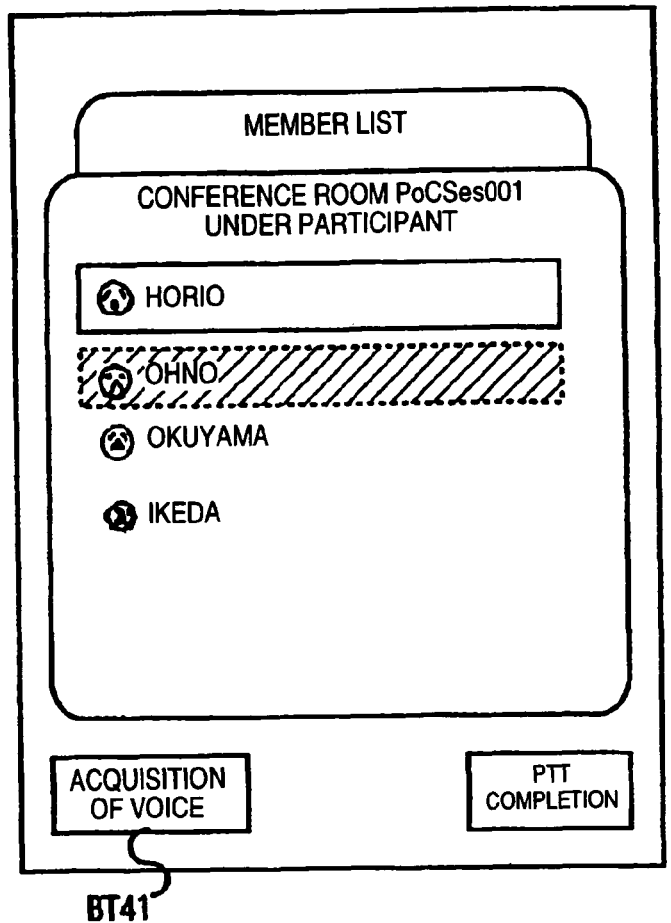
FIG. 17 is a block diagram illustrating an example of display format.
FIG. 18 is a block diagram illustrating an example of content of a voice recording unit.

When the terminal 2T having the voice does not exist (No. in 16020 of FIG. 16), the voice is given, it is then registered to the PTT management unit 110, and acquisition of the voice is notified to the requesting terminal 2T. Moreover, the user ID of the terminal 2T having acquired the voice and the user ID as the partner are notified to the other terminals 2T participating to the conference room (16040 of FIG. 16). In this timing, the terminal 2T registers, upon reception of these user ID having acquired the voice and the user ID as the partner of speech, these information pieces received to the voice recording unit 206. An example of the voice recording unit 206 in this embodiment is illustrated in FIG. 18. The voice recording unit 206 in this embodiment includes voice owner 181 and partner 182. To the voice owner 181, the user ID of the terminal having acquired the voice is set and to the partner 182, the user ID of the terminal 2T as the partner of speech is set.

In the example of FIG. 17, horio (user ID: horio@fujiPoC.com) selects ohno (user ID: ohno@fujiPoC.com) to request the voice. An example of the PTT management unit 110 of FIG. 21 illustrates a condition after the voice of horio is recognized and is then registered. In the timing where horio requests the voice, okuyama (user ID: okuyama@fujipoc.com) is registered as the voice owner 65, while ikeda (user ID: ikeda@fujipoc.com) as the partner 66 to the item of the voice 64. Horio (user ID: horio@fujipoc.com) requesting the voice is not yet registered to the voice owner 65 of the voice 64 of the PTT management unit 110 and ohno (user ID: ohno@fujipoc.com) designated as the partner is not registered to the partner 66. Therefore, the voice is given, it is registered to the PTT management unit 110, and notified that horio (user ID: horio@fujipoc.com) has acquired the voice. Moreover, the user ID of the terminal having acquired the voice and the user ID of the terminal having been designated as the partner of speech are identified to the other terminals 2T participating to the same conference room. The terminals 2T having received the notification respectively register the newly notified user ID: horio@fujipoc.com having acquired the voice and the user ID: ohno@fujipoc.com designated as the partner to the voice recording unit 206 (FIG. 18).

In above description, an example is given in which the voice is given to a plurality of users so long as the partners overlap, but it is also possible that the voice is given only to one terminal 2T, as in the example first embodiment.

After completion of the voice acquiring process, the process shifts to operation 2110 illustrated in FIG. 2.

Next, an example flow of processes for controlling communication bandwidth in an example third embodiment will be described with reference to FIG. 19. Procedures after the terminal 2T has requested the data transmission right will be described.

The terminal 2T conducts the following determination for the other terminals participating in the same conference room so as to calculate a value that may be used in reception of the data with the down-stream communication bandwidth of respective terminals 2T.

The terminal 2T determines whether the data transmission right has been acquired. When the data transmission right is acquired (Yes in 19010 illustrated in FIG. 19), a communication bandwidth for transmission of data is calculated using the following example procedures for each terminal 2T designated as a partner in the data transmission.

Whether the terminal 2T, as the partner of the data transmission, is registered as the partner 182 of voice is determined referring to the voice storage unit 206 (FIG. 18). When the terminal 2T is registered as the partner 182 of the voice (Yes in 19020 of FIG. 19), the relevant terminal 2T calculates, in order to receive both voice data and the other data, a value, obtained by subtracting the communication bandwidth required for reception of the voice data from the communication bandwidth which the relevant terminal 2T can use, as an down-stream communication bandwidth of the relevant terminal 2T (19030 of FIG. 19). When the terminal is not registered as the partner of the voice (No in 19020 of FIG. 19), the relevant terminal 2T sets, to receive only the data other than voice, the communication bandwidth which the relevant terminal 2T can use as the down-stream communication bandwidth of the terminal 2T (19040 of FIG. 14).

If the calculation of communication bandwidths that may be used for data transmission is not completed for all terminals 2T designated as partners of the data transmission (Operation 19050 of FIG. 19), the operations are repeated from operation 19020.

Figure 19:
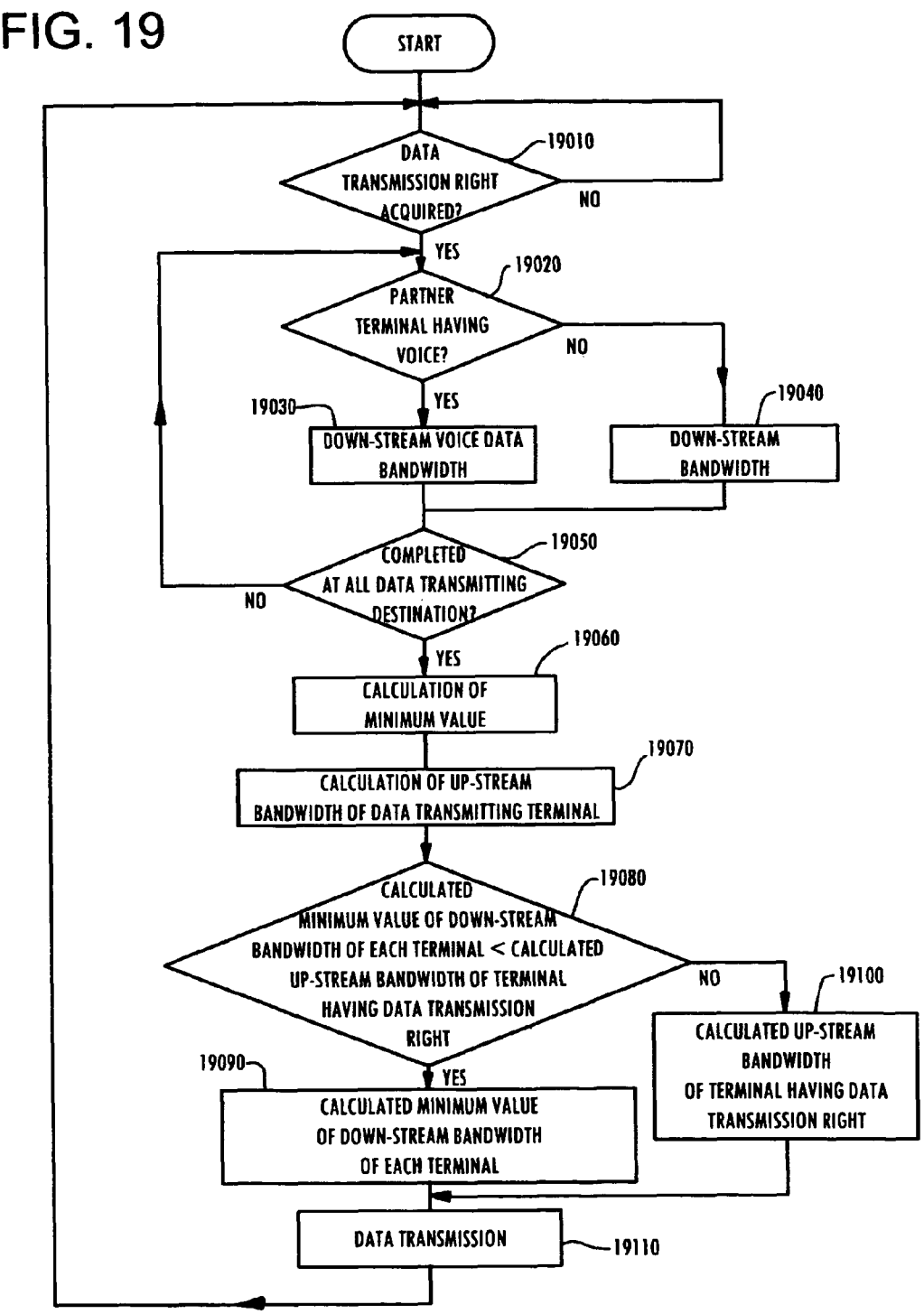
FIG. 19 is a flow chart illustrating processes for communication bandwidth control in a third embodiment according to the present invention.

When the calculation of the communication bandwidth used for data transmission is completed for all terminals 2T that are designated as partners of data transmission (Yes in Operation 19050 of FIG. 19), a minimum value of the calculated communication bandwidths, for a terminal 2T as a partner of data transmission, is extracted (Operation 19060 of FIG. 19).

Moreover, when the terminal 2T having acquired the data transmission right is verified to have also acquired voice, a value obtained by subtracting the bandwidth of the voice data from an available up-stream communication bandwidth, which the relevant terminal 2T can use, is set as a useable-stream communication bandwidth. When the terminal 2T is verified not to have voice data, the useable up-stream communication bandwidth which the relevant terminal 2T can use is set as available up-stream communication bandwidth (Operation 19070 of FIG. 19).

The calculated minimum down-stream communication bandwidth of each terminal 2T is compared with the calculated up-stream communication bandwidth of the terminal 2T having acquired the data transmission right.

When the calculated minimum value of the down-stream communication enabling bandwidth of each terminal 2T is less than the calculated up-stream communication enabling bandwidth of the terminal 2T having acquired the data transmission right (Yes in operation 190080 of FIG. 19), the calculated minimum down-stream communication bandwidth of each terminal 2T is set as the usable communication bandwidth for data transmission (operation 19090 of FIG. 19). When the calculated up-stream communication enabling bandwidth of the terminal 2T having acquired the data transmission right is less than the calculated minimum down-stream communication bandwidth of each terminal 2T (operation 19080 of FIG. 19), a value of the calculated up-stream communication enabling bandwidth of the terminal 2T having acquired the data transmission right is set as the useable communication bandwidth for data transmission (operation 19100 of FIG. 19).

The data is transmitted to the terminal 2T designated as the partner of the data transmission with the useable communication bandwidth set by the operations described above (operation 9110 of FIG. 19).

In this example embodiment, change in the communication bandwidth during data transmission is not illustrated, but it is possible to add operations so as to dynamically change the communication bandwidth for transmission of data by monitoring a change in a setting of the voice as in the case of the example first embodiment.

Accordingly, even when a destination of voice data transmitted from the terminal 2T having acquired the voice and destination of other data transmitted from the terminal 2T having the data transmission right are only part of the members of the conference room and participants, the communication bandwidth for data transmission can be set in accordance with the voice data and the other data receiving conditions of the terminals 2T.

According to an example fourth embodiment of the present invention, voice data can also be transmitted to some of the terminals.

As in the case of the example second embodiment, an example of controlling the communication bandwidth for transmission of data in the side of server 3S is illustrated.

A system structure of the fourth embodiment is similar to that illustrated in FIG. 11. As in the example third embodiment, the terminal 3T1 (user: horio) designates three partners of terminal 3T2 (user: ohno), terminal 3T3 (user: okuyama) and terminal 3T4 (user: ikeda) to enable the broadcast communication by four parties with the procedures described in the third embodiment under the condition of the PTT management unit 110 of FIG. 20.

Figure 20:
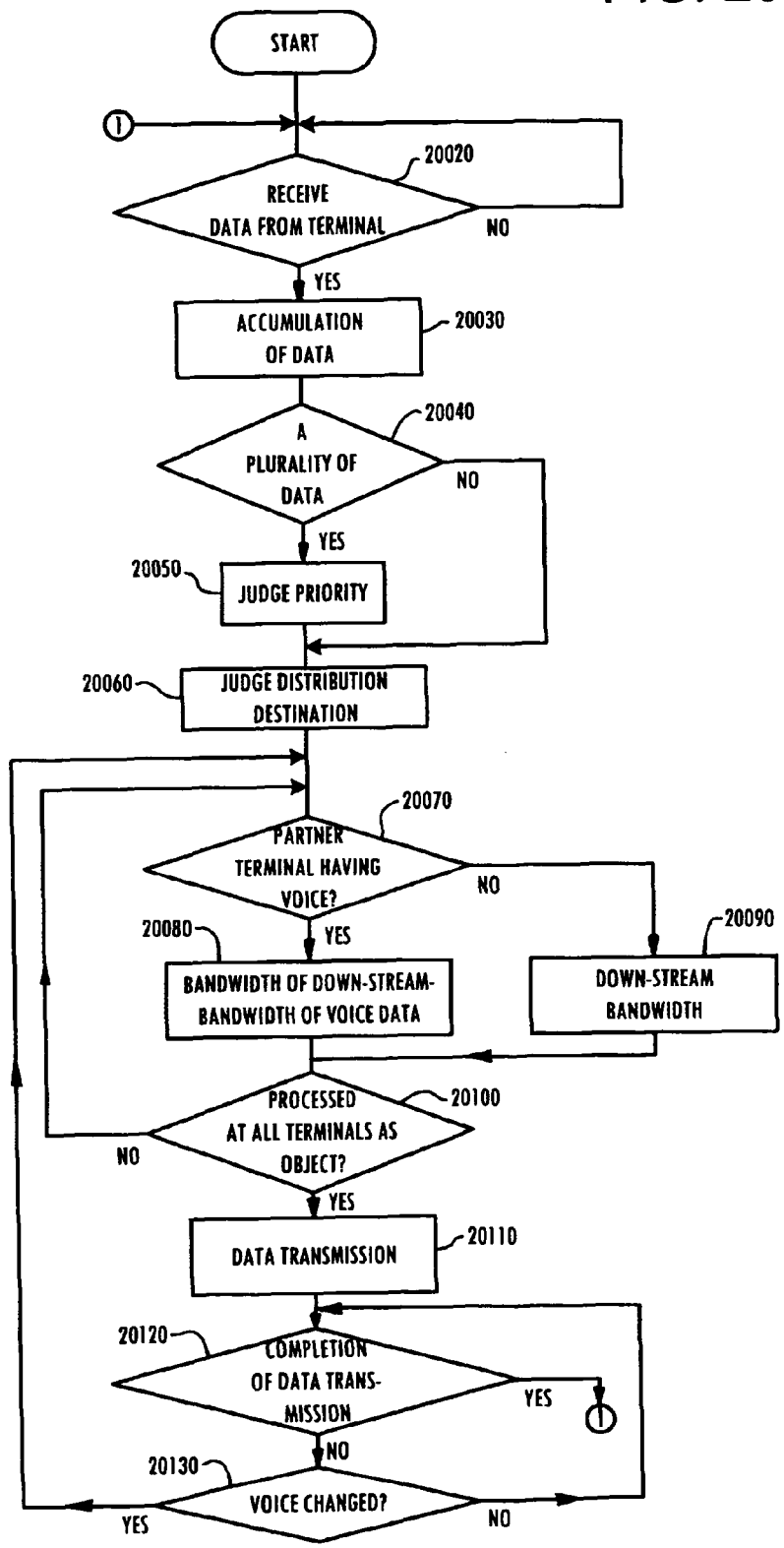
FIG. 20 is a flow chart illustrating for communication bandwidth control in a fourth embodiment.

Flow of processes for controlling the communication bandwidth with the server 3S in this embodiment will be described with reference to FIG. 20. In FIG. 20, the processes after collection of the down-stream communication bandwidths of the terminal 3S are described.

The processes from operations 20020 to 20050 are similar to those in operations 12020 to 12050, and a similar description is omitted here.

In the priority judgment (20050), the terminal 3T as the distribution destination for the data as the transmission object is identified (20060 of FIG. 20) and the communication bandwidth for data transmission is calculated for each terminal 3T.

Whether the terminal 3T as a partner of data transmission is registered as a partner 66 of the voice transmission is verified by referring to the PTT management unit 110. Upon designation as the partner of the voice (Yes in operation 20070 of FIG. 20), the server 3S sets a value obtained by subtracting the bandwidth required for voice data from the down-stream communication bandwidth which the relevant terminal 3T can use as the useable communication bandwidth for transmission of data to the terminal 3T since the relevant terminal 3T receives both the voice data and the other data (operation 200080 of FIG. 20). When not registered as a partner of the voice transmission (No in operation 20070 of FIG. 20), the relevant terminal 3T sets a value for a down-stream communication bandwidth which the relevant terminal 3T can use as the available communication bandwidth for data transmission since the relevant terminal 3T receives only the data (operation 20090 of FIG. 20).

If calculation of the communication bandwidth used for data transmission is not completed for all terminals 3T designated as the partners of the data transmission (No in operation 20100 of FIG. 20), the processes of the terminal 3T not completed in the calculation are repeated continued by returning to the operation 20070.

When the communication bandwidth used for data transmission is determined for all terminals 3T designated as the partners of the data transmission (Yes in operation 20100 of FIG. 20), the data is transmitted with the calculated or preset communication bandwidth for each terminal 3T (20110 of FIG. 20).

The operations 20120 to 20130 are similar to that up those in operations 12110-12120 and the similar description is omitted here. These steps can be executed as required as in the case of second embodiment and are not always required.

As described above, a broadcast communication system which enables transmission and reception of voice data and the other data without deterioration in the quality of voice data is realized by controlling the communication bandwidth for distribution of the voice data and the other data in accordance with whether the broadcast communication by voice data is performed. Moreover, when the server controls the communication bandwidth for data distribution, the communication bandwidth is controlled in accordance with the conditions of communication of the terminals for each terminal. Accordingly, if the communication bandwidths of the terminals participating in conference room are different, the communication is removed of the influence of the terminals having lower communication bandwidths.

In the above example embodiment, an example of the transmission and reception of the voice data and the other data is described. Additional embodiments of the present invention include quality improvements in transmission of both picture data and the data other than the picture data. Further, embodiments of the present invention may be executed by computer instructions stored in a computer storage.

Moreover, in above embodiments, only the functions regarding the broadcast communication system are described for a server and terminals. However, the server and terminals may be used in combination with the other functions.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A communication bandwidth control method for a broadcast communication system in which any of a plurality of user terminals acquires a transmission right of first data, transmits the first data and distributes the first data transmitted from a first user terminal to a second user terminal via a communication network, the method comprising:

collecting and storing values of communication bandwidths usable by the user terminals in correspondence with information identifying the user terminals;

determining whether a first data source user terminal among the plurality of user terminals has acquired the transmission right of the first data;

if determined that the first data source user terminal has acquired the transmission right of the first data, setting a second data communication bandwidth of the first data source user terminal, usable to send or to receive the second data, to be a communication bandwidth which has been collected and stored as corresponding to the first data source user terminal, and setting the second data communication bandwidth of another user terminal, usable to send or to receive the second data, to be a difference between a communication bandwidth which has been collected and stored as corresponding to the other user terminal, and a first data communication bandwidth required for reception of the first data; and if determined that no user terminal has acquired the transmission right of the first data, setting the second data communication bandwidth usable to send or to receive the second data for each of the user terminals to be the communication bandwidth collected and stored as being usable by each of the user terminals, respectively.

2. The communication bandwidth control method according to claim 1, wherein the first data is required to have a realtime property and the second data is not always required to have the realtime property.

3. The communication bandwidth control method according to claim 2, wherein the first data is voice data and the second data is data other than the first data.

4. A communication bandwidth control method used in a broadcast communication system in which any of a plurality of user terminals acquires the transmission right of first data, transmits the first data and distributes the first data transmitted from a first user terminal to a second user terminal among a plurality of user terminals via a communication network, comprising:
  collecting values of the communication bandwidths usable by the user terminals and storing the values in correspondence with information identifying the user terminals;
  determining for each user terminal whether the user terminal is designated as a first data transmitting destination and whether the user terminal is designated as a second data transmitting destination;
  upon determining that the user terminal is designated as both a first data transmitting destination and a second data transmitting destination, setting a communication bandwidth usable by the user terminal to send or to receive the second data, to be a difference between a value of a communication bandwidth which has been collected and stored as corresponding to the user terminal and a communication bandwidth required for receiving the first data; and
  upon determining that the user terminal is designated as the second data transmitting destination only, setting the communication bandwidth usable by the user terminal to receive or to send the second data to be the value of the communication bandwidth which has been collected and stored as corresponding to the user terminal.

5. The communication bandwidth control method according to claim 4, wherein the first data is required to have a realtime property and the second data is not always required to have the realtime property.

6. The communication bandwidth control method according to claim 5, wherein the first data is voice data and the second data is data other than the first data.

7. A communication bandwidth control method used in a user terminal of a broadcast communication system in which any of a plurality of user terminals acquires a transmission right of first data, transmits the first data and distributes the first data transmitted from a first user terminal to a second user terminal of a plurality of user terminals via a communication network, comprising:
  collecting values of communication bandwidths which user terminals can use and storing the values in correspondence with the information identifying user terminals;
  determining whether any of the plurality of user terminals has acquired a transmission right of first data upon a user terminal requesting and acquiring a second transmission right of second data;
  if determined that a first data source user terminal has acquired the first transmission right,
  setting a second data communication bandwidth of the first data source user terminal usable to send or to receive the second data, to be a communication bandwidth which has been collected and stored as corresponding to the first data source user terminal, and
  setting a second data communication bandwidth of another user terminal, usable to send or to receive the second data, to be a difference between a communication bandwidth which has been collected and stored as corresponding to the other user terminal, and a first data communication bandwidth required for transmission of the first data;
  if determined that no user terminal has acquired the transmission right of the first data, setting the second data communication bandwidth usable to send or to receive the second data, to be the communication bandwidth collected and stored as being usable by each of the user terminals, respectively, and obtaining a minimum value among second data communication bandwidths usable to send or to receive the second data that is set for the user terminals;
  if the first data source user terminal has acquired the transmission right of the second data, comparing the second data communication bandwidth of the first data source user terminal with the minimum value and if the minimum value is smaller than the second data communication bandwidth of the first data source user terminal, setting the second data communication bandwidth to be the minimum value; and
  if a second data source user terminal has acquired the transmission right of the second data, but not acquired the transmission right of the first data, comparing communication bandwidth which has been collected and stored as corresponding to the second data source terminal with the minimum value and if the minimum value is smaller than the second data communication bandwidth of the second data source setting the second data communication bandwidth to be the minimum value.

8. The communication bandwidth control method according to claim 7, wherein the first data is required to have a realtime property and the second data is not always required to have the realtime property.

9. The communication bandwidth control method according to claim 8, wherein the first data is voice data and the second data is data other than the first data.

10. A communication bandwidth control method used in a user terminal of a broadcast communication system in which a first one of a plurality of user terminals acquires the transmission right of first data, transmits the first data and distributes the first data transmitted from the first one of the user terminals to a second one of the user terminals via a communication network, comprising:
  collecting and storing values of communication bandwidths usable by the user terminals in correspondence with information identifying the user terminals;
  determining whether a first user terminal that is designated as a transmitting destination of first data is designated as a transmitting destination of second data upon a second user terminal acquiring a transmission right of the second data;
  setting a second data communication bandwidth usable to send or to receive the second data to be a value obtained by subtracting a communication bandwidth required for transmission of the first data from a value of the communication bandwidth which has been collected and stored as corresponding to the first user terminal;
  setting the second data communication bandwidth usable to send or to receive the second data to be a value of the communication bandwidth which has been collected and stored as corresponding to a third user terminal when the third user terminal is not designated as the transmitting destination of the first data and obtaining a minimum value among second data communication bandwidths assigned to the user terminals;

comparing the second data communication bandwidth with the minimum value, and setting the second data communication bandwidth to be the minimum value if the minimum value is less than the second data communication bandwidth, when the second user terminal having acquired the transmission right of the second data has also acquired the transmission right of the first data; and comparing the communication bandwidth stores in correspondence with identification information of the second user terminal that has acquired the transmission right of the second data with the minimum value obtained and setting the second data communication bandwidth to be the minimum value if the minimum value is less than the communication bandwidth, when no user terminal that has acquired the transmission right of the second data has acquired the transmission right of the first data.

11. The communication bandwidth control method according to claim 10, wherein the first data is required to have a realtime property and the second data is not always required to have the realtime property.

12. The communication bandwidth control method according to claim 11, wherein the first data is voice data and the second data is data other than the first data.

13. A server used in a broadcast communication system in which a first one of a plurality of user terminals acquires a transmission right of first data, transmits the first data and distributes the first data transmitted from the first one of the user terminals to a second one of the user terminals via a communication network, comprising:

a memory storing data and communicating with the server including:

a user terminal communication bandwidth collecting unit collecting and storing values of communication bandwidths of the user terminals in a database in correspondence with information for identifying the user terminals;

a first data transmission right management unit giving a transmission right of the first data to a first data source user terminal among the user terminals in accordance with a first data transmission right acquiring request received from the user terminals, and storing information about the first data source user terminal;

a second data storing unit storing second data received from a second data source user terminal among the user terminals in correspondence with identifying information of the second data source user terminal;

a second data communication bandwidth calculating unit
obtaining from the database a first communication bandwidth required for transmission of the first data,
determining whether the first data source user terminal is registered by referring to the database,
calculating, when the first data source user terminal is registered, a value of a second data communication bandwidth usable to send or to receive the second data for the first data source user terminal,
calculating, for each user terminal other than the first data source user terminal, the second data communication bandwidth by subtracting the first communication bandwidth from a corresponding communication bandwidth which has been collected and stored as corresponding to the user terminal, by referring, when the first data source user terminal is not registered, to the database, and
setting the second data communication bandwidth as calculated; and a second data distributing unit to send the second data to each user terminal using the second data communication bandwidth calculated and set by the second data communication bandwidth calculating unit.

14. The server according to claim 13, further comprising:
a second data distributing condition supervising unit supervising a distributing condition of the second data sent by the second data distributing unit; and a communication bandwidth change instructing unit
recalculating the second data communication bandwidth of the second data with the second data communication bandwidth calculating unit, and
instructing sending the second data using the second data communication bandwidth to the second data distributing unit when the second data distributing condition supervising unit detects that a change or a deletion of the first data source user terminal in the first data transmission right management unit, until a completion of data transmission is verified.

15. The server according to claim 13 or 14, wherein the first data is required to have a realtime property and the second data is not required to a realtime property.

16. The server according to claim 13 or 14, wherein the first data is voice data and the second data is data other than the voice data.

17. A server used in a broadcast communication system in which a first one of a plurality of user terminals acquires a transmission right of first data, transmits the first data and distributes the first data transmitted from the first one of the user terminals to a second one of the user terminals via a communication network, comprising:

a memory storing data and communicating with server including:

a user terminal communication bandwidth collecting unit collecting values of communication bandwidths which user terminals can use and storing the values in a database in correspondence with information for identifying the user terminals;

a first data transmission right management unit giving a transmission right of the first data to a first data source user terminal among the user terminals in accordance with a first data transmission right acquiring request received from the user terminals, and storing identifying information about the first data source user terminal and identifying information about user terminals that are each a first data transmitting destination;

a second data storing unit storing a second data received from a second data source user terminal in correspondence with identifying information of the second data source user terminal, and identifying information of user terminals which are each a second data transmitting destination;

a second data communication bandwidth calculating unit
obtaining from the database a first communication bandwidth required for transmission of the first data,
determining whether a user terminal is registered as a first data transmitting destination is a second data transmitting destination,
calculating a second data communication bandwidth of the user terminal stored as a first data transmitting destination and as the second data transmitting destination by subtracting the communication bandwidth from a corresponding communication bandwidth which has been collected and stored in the user terminal communication bandwidth collecting unit for the user terminal, and setting a second data communication bandwidth for each user terminal that is not registered as a first data transmitting destination to be the communication bandwidth collected and stored in user terminal communication bandwidth collecting unit for each user terminal; and a second data distributing unit transmitting the second data to each user terminal designated as a second data transmitting destination according to the second data communication bandwidth calculated by the second data communication bandwidth calculating unit.

18. The server described in the claim 17, further comprising:

a second data distributing condition supervising unit supervising a distributing condition of the second data transmitted by the second data distributing unit, and a communication bandwidth change instructing unit recalculating the second data communication bandwidth with the second data communication bandwidth calculating unit and instructing transmission of the second data with the recalculated second data communication bandwidth to the second data distributing unit when the second data distributing condition supervising means detects that a change or a deletion of the first data source user terminal with the first data transmission right management unit, until the completion of data transmission is verified.

19. The server according to claim 17 or 18 wherein the first data is required to have a realtime property and the second data is not required to a realtime property.

20. The server according to claim 17 or 18 wherein the first data is voice data and the second data is data other than the voice data.

21. A user terminal for a broadcast communication system in which a first one of a plurality of user terminals acquires a transmission right of first data, transmits the first data and distributes the first data transmitted from the first one of the user terminals to a second one of the user terminals, comprising:

a memory storing data and communicating with the broadcast communication system including:

a first data transmission right acquiring condition management unit storing identifying information of a first data source user terminal having the transmission right of the first data among a plurality of user terminals, a second data transmission bandwidth control unit, determining whether the user terminal has acquired the transmission right of the first data by referring to the first data transmission right acquiring condition management unit, setting a second data communication bandwidth by subtracting a communication bandwidth required for transmission of the first data from a communication bandwidth of the user terminal when determined that the transmission right of the first data is acquired, and setting the second data communication bandwidth of the user terminal to be a communication bandwidth of the user terminal when the transmission right of the first data is not acquired; and a second data transmitting unit transmitting the second data using the second data communication bandwidth set by the second data transmission bandwidth control unit.

22. The user terminal described in the claim 21, further comprising:

a second data transmitting condition supervising unit supervising whether transmission of the second data has been completed; and a communication bandwidth re-calculation instructing unit instructing the second data transmission bandwidth control unit to recalculate the second data communication bandwidth when a change is generated in the user terminal having acquired the transmission right of the first data stored in the first data transmission right acquiring condition management unit, until completion of transmission of the second data.

23. The user terminal according to claim 21 or 22, wherein the first data is required to have a realtime property and the second data is not required to have a realtime property.

24. The user terminal according to claim 21 or 22, wherein the first data is voice data and the second data is data other than the voice data.

25. A user terminal for a broadcast communication system in which a first one of a plurality of user terminals acquires a transmission right of first data, transmits the first data and distributes the first data transmitted from the first one of the user terminals to a second one of user terminals using a communication enabling bandwidth, comprising a memory storing data and communicating with the broadcast communication system including:

a user terminal communication bandwidth management unit collecting values of communication bandwidths of the user terminals and storing the values in correspondence with identifying information of the user terminals;

a communication enabling bandwidth setting unit identifying a minimum value of the collected communication bandwidths, comparing the minimum value with a communication bandwidth of the user terminal, setting the minimum value as the communication enabling bandwidth when the communication bandwidth of the user terminal is larger than the minimum value, and setting the communication bandwidth of the user terminal as the communication enabling bandwidth when the minimum value is larger;

a first data transmission right control unit receiving a first data transmission right acquiring condition notification and storing identifying information of a first data source user terminal that has acquired the transmission right of the first data;

a second data transmission right control unit receiving a second data transmission right acquiring condition notification and storing identifying information of a second data source user terminal that has acquired the transmission right of the second data; and a second data transmitting unit transmitting the second data using the second data communication bandwidth calculated with the second transmitting communication bandwidth control unit.

26. The user terminal according to claim 25, further comprising:

a second data transmitting condition supervising unit supervising a transmitting condition of the second data transmitted by the second data transmitting unit; and a communication bandwidth change instructing unit re-calculating the second data communication bandwidth with the second data communication bandwidth calculating unit, and instructing the second data distributing unit to transmit the second data according to the recalculated communication bandwidth when the second data distributing condition supervising unit detects that a change or a deletion of the first data source user terminal has occurred in the first data transmission right management unit, until a completion of data transmission is verified.

27. The user terminal according to claim 25, wherein the first data is required to have a realtime property and the second data is not required to have a realtime property.

28. The user terminal according to claim 25, wherein the first data is voice data and the second data is data other than the voice data.

29. A user terminal for a broadcast communication system in which a first one of a plurality of user terminals acquires a transmission right of a first data, transmits the first data and distributes the first data transmitted from the first one of the user terminals to a second one of the user terminals, comprising:
   memory storing data and communicating with the broadcast communication system including:
   a user terminal communication bandwidth management unit collecting communication bandwidth values which each user terminal can use and storing the values in correspondence with information for identifying the user terminals;
   a first data transmission right control unit receiving a first data transmission right acquiring condition notification and storing identifying information of a first data source user terminal that has acquired the transmission right of the first data, and identifying information of user terminals which are each a first data transmitting destination;
   a second data transmission right control unit receiving a second data transmission right acquiring condition notification, and storing identifying information of a second data source user terminal that has acquired a transmission right of second data;
   a second data transmitting communication bandwidth control unit
      determining whether a user terminal designated as a second data transmitting destination is designated as a first data transmitting destination when the transmission right of the second data is obtained,
      setting a second data communication bandwidth by subtracting a communication bandwidth required for transmission of the first data from the communication bandwidth collected and stored for the user terminal when the user terminal is designated as a first data transmitting destination,
      setting the second data communication bandwidth to be the communication bandwidth of the user terminal when the user terminal is not designated as a first data transmitting destination, and obtaining a minimum value of second data communication bandwidths,
      comparing a value obtained by subtracting a communication bandwidth required for transmission of the first data from the communication bandwidth of the second data source user terminal with the minimum value and setting the lesser value as the second data communication bandwidth when the second data source user terminal has the transmission right of the first data, and
      comparing a communication bandwidth stored as corresponding to the second data source user terminal with the minimum value and setting the lesser value as the second data communication bandwidth when the second data source user terminal does not have the transmission right of the first data; and
   a second data transmitting unit transmitting the second data using the second data communication bandwidth calculated with the second data transmitting communication bandwidth control unit.

30. The user terminal according to claim 29, further comprising:
   a second data transmitting condition supervising unit supervising a transmitting condition of the second data transmitted by the second data transmitting unit, and
   a communication bandwidth change instructing unit recalculating the second data communication bandwidth with the second data communication bandwidth calculating unit, and instructing the second data distributing unit to transmit the second data with the recalculated second data communication bandwidth, when the second data distributing condition supervising unit detects that a change or a deletion of the first data source user terminal occurs in the first data transmission right management unit, until a completion of data transmission is verified.

31. The user terminal according to claim 29 or 30 wherein the first data is required to have a realtime property and the second data is not required to have a realtime property.

32. The user terminal according to claim 29 or 30 wherein the first data is voice data and the second data is data other than the voice data.

33. A non-transitory computer-readable storage storing a computer-readable program which controls a computer system to control a server, which is used for the broadcast communication system in which a first one of a plurality of user terminals acquires the transmission right of the first data, transmits the first data and distributes the first data transmitted from the first one of the user terminals to a second one of the user terminals via a communication network, to execute the processes, by performing a method comprising:
   collecting and storing values of communication bandwidths of user terminals in a database in correspondence with information to identify the user terminals;
   giving a transmission right of the first data to a first data source user terminal among the user terminals in accordance with a first data transmission right acquiring request from the user terminals, and storing information about the first data source user terminal;
   storing second data received from a second data source user terminal in correspondence with identifying information of the second data source user terminal;
   obtaining from the database a first communication bandwidth required for transmission of the first data,
   determining whether the first data source user terminal is registered by referring to the database;
   setting a second data communication bandwidth of the first data source user terminal to the communication bandwidth collected and stored for the first data user terminal by referring to the database and calculating a second data communication bandwidth for each user terminal other than the first data source user terminal by subtracting the first communication bandwidth from a corresponding communication bandwidth collected and stored for each user terminal other than the first data source user terminal;
   setting the second data communication bandwidth for each user terminal to be the communication bandwidth collected and stored in the database corresponding to the user terminal when no first data source user terminal is registered; and
   transmitting the second data to each user terminal using the second data communication bandwidth.

34. A non-transitory computer-readable storage storing a computer-readable program which controls a computer system to control a server used in a broadcast communication system, in which a first one of a plurality of user terminals acquires the transmission right of a first data, transmits the first data and distributes the first data transmitted from the first one of the user terminals to a second one of the user terminals, by performing a method comprising:

collecting and storing values of communication bandwidths of user terminals and storing these values in correspondence with information for identifying the user terminals, giving a first data transmission right of the first data to a first data source user terminal among the user terminals in accordance with a first data transmission right acquiring request, and storing, in a database, identification information about the first data source user terminal and identifying information about at least one user terminal designated as a first data transmitting destination, storing second data received from the user terminals in correspondence with identifying information of a second data source user terminal and identifying information of at least one user terminal as a second data transmitting destination;

obtaining from the database a first communication bandwidth required for transmission of the first data, determining whether a user terminal registered as a first data transmitting destination is a second data transmitting destination, calculating a second data communication bandwidth of a user terminal registered as a first data transmitting destination by subtracting a communication bandwidth from a corresponding communication bandwidth value which has been collected and stored for the user terminal, and setting a second data communication bandwidth for each user terminal which is not registered as the first data transmitting destination to be the communication bandwidth collected and stored for each user terminal; and transmitting the second data to the user terminal registered as the second data transmitting destination using the second data communication bandwidth.

35. A non-transitory computer-readable storage storing a computer-readable program which controls a computer system to control a user terminal used in a broadcast communication system, in which a first one of a plurality of user terminals acquires the transmission right of a first data, transmits the first data and distributes the first data transmitted from the first one of the user terminals to a second one of the user terminals, by performing a method comprising:

storing in a database identifying information of a first data source user terminal that has acquired a transmission right of first data among a plurality of user terminals;

determining, for transmission of second data, whether the user terminal is the first data source user terminal by referring to the database;

setting a second data communication bandwidth of the user terminal by subtracting a communication bandwidth required for transmission of the first data from a communication bandwidth of the user terminal when the user terminal is the first data source user terminal, and setting the second data communication bandwidth of the user terminal to be the communication bandwidth of the user terminal when the user terminal is not the first data source user terminal, and transmitting the second data using the second data communication bandwidth.

36. A non-transitory computer-readable storage storing a computer-readable program which controls a computer system to control a user terminal used in a broadcast communication system in which a first one of a plurality of user terminals acquires the transmission right of a first data, transmits the first data and distributes the first data transmitted from the first one of the user terminals to a second one of the user terminals using a communication enabling bandwidth, by performing a method comprising:

collecting values of communication bandwidths of the user terminals and storing these values in correspondence with identifying information of the user terminals;

identifying a minimum value among the collected and stored communication bandwidths, comparing the minimum value with a communication bandwidth of the user terminal, setting the minimum value as a communication enabling bandwidth when the communication bandwidth of the user terminal is larger than the minimum value;

setting the communication bandwidth of the user terminal as the communication enabling bandwidth when the minimum value is larger;

controlling a transmission right of the first data by receiving a first data transmission right acquiring condition notification and storing identifying information of a first data source user terminal that has acquired the transmission right of the first data;

controlling a transmission right of second data by receiving a second data transmission right acquiring condition notification and storing identifying information of a second data source user terminal that has acquired the transmission right of the second data;

controlling a second data transmitting communication bandwidth by determining whether the user terminal is the first data source user terminal when determined that the user terminal is the second data source user terminal;

setting a second data communication bandwidth by subtracting the first data communication bandwidth from the communication bandwidth that has been collected and stored as corresponding to the user terminal when the user terminal is the first data source user terminal, comparing a communication bandwidth of the first data source user terminal with a value obtained by subtracting the communication bandwidth required for reception of the first data from a communication bandwidth of another user terminal having no transmission right in order to identify a minimum value when the other user terminal is the first data source user terminal, setting the second data communication bandwidth to be a value of the communication enabling bandwidth of the user terminal when the communication enabling bandwidth of the user terminal is less than the identified minimum value setting the minimum value as the second data communication bandwidth when the minimum value is a lesser value, and setting the second data communication bandwidth to be the communication enabling bandwidth of the user terminal when no user terminal is the first data source user terminal; and transmitting the second data using the second data communication bandwidth.

37. A non-transitory computer-readable storage storing a computer-readable program which controls a computer system to control a user terminal used in a broadcast communication system in which a first one of a plurality of user terminals acquires the transmission right of a first data, transmits the first data and distributes the first data transmitted from the first one of the user terminals to a second one of the user terminals, by performing a method comprising:

collecting communication bandwidth values for each user terminal and storing these values in correspondence with information for identifying the user terminals, receiving a first data transmission right acquiring condition notification, and storing identifying information about a first data source user terminal that has a first data transmission right for first data and identifying information about at least one user terminal designated as a first data transmitting destination, receiving a second data transmission right acquiring condition notification and storing identifying information about a second data source user terminal has a second data transmission right for second data, controlling a second data transmitting communication bandwidth by determining whether any user terminal designated as a second data transmitting destination is designated as a first data transmitting destination when the second data transmission right is obtained, setting a second data communication bandwidth by subtracting a communication bandwidth required for transmission of the first data from a communication bandwidth collected and stored for a user terminal designated as the first data transmitting destination, setting a second data communication bandwidth to be a value of a communication bandwidth collected and stored for a user terminal when the user terminal not designated as the first data transmitting destination, and obtaining a minimum value among second data communication bandwidths assigned to the user terminals, comparing a value obtained by subtracting the communication bandwidth required for transmission of the first data from a communication bandwidth collected and stored for the second data source user terminal with the minimum value and setting the smaller value as the second data communication bandwidth when the second data source user terminal is the first data source user terminal;

comparing a communication bandwidth collected and stored for the second data source user terminal with the minimum value and setting the lesser value as the second data communication bandwidth when the second data source user terminal is not the first data source user terminal; and transmitting the second data using the second data communication bandwidth.

* * * * *

UNITED STATES PATENT AND TRADEMARK OFFICE
CERTIFICATE OF CORRECTION

PATENT NO. : 7,917,640 B2  Page 1 of 1
APPLICATION NO. : 11/174492
DATED : March 29, 2011
INVENTOR(S) : Kenichi Horio et al.

It is certified that error appears in the above-identified patent and that said Letters Patent is hereby corrected as shown below:

Column 32, Line 33 in Claim 17, after "with" insert -- the --.

Column 34, Line 13 in Claim 29, before "memory" insert -- a --.

Signed and Sealed this
Twenty-eighth Day of June, 2011

David J. Kappos
*Director of the United States Patent and Trademark Office*